United States Patent
Seader

(10) Patent No.: US 9,750,308 B2
(45) Date of Patent: Sep. 5, 2017

(54) DEVICE FOR SECURING ROPE IN MULTIPLE CONFIGURATIONS AND PROCESS OF USING THE SAME

(71) Applicant: Nite Ize, Inc., Boulder, CO (US)

(72) Inventor: Rex Seader, Superior, CO (US)

(73) Assignee: NITE IZE, INC., Boulder, CO (US)

( * ) Notice: Subject to any disclaimer, the term of this patent is extended or adjusted under 35 U.S.C. 154(b) by 31 days.

(21) Appl. No.: 14/882,037

(22) Filed: Oct. 13, 2015

(65) Prior Publication Data
US 2016/0066654 A1 Mar. 10, 2016

Related U.S. Application Data

(63) Continuation of application No. 13/322,308, filed as application No. PCT/US2010/035592 on May 20, 2010, now Pat. No. 9,157,505.

(60) Provisional application No. 61/217,014, filed on May 26, 2009.

(51) Int. Cl.
| | |
|---|---|
| *A43C 7/00* | (2006.01) |
| *A43C 1/06* | (2006.01) |
| *F16G 11/10* | (2006.01) |
| *F16G 11/14* | (2006.01) |
| *F16G 11/04* | (2006.01) |

(52) U.S. Cl.
CPC ............ *A43C 7/00* (2013.01); *A43C 1/06* (2013.01); *F16G 11/046* (2013.01); *F16G 11/10* (2013.01); *F16G 11/103* (2013.01); *F16G 11/14* (2013.01); *Y10T 24/3916* (2015.01); *Y10T 29/49826* (2015.01)

(58) Field of Classification Search
CPC ........ F16G 11/10; F16G 11/14; F16G 11/103; F16G 11/046; A43C 7/00; A43C 1/06

USPC ................. 24/129 R, 115 G, 115 J, 130
See application file for complete search history.

(56) References Cited

U.S. PATENT DOCUMENTS

| | | | |
|---|---|---|---|
| 1,383,665 A | 7/1921 | Rohan | |
| 1,896,705 A | * 2/1933 | Geisenhoner | .......... F16G 11/00 24/115 R |
| 2,450,358 A | 9/1948 | Romano | |
| 2,592,696 A | 4/1952 | Hoody | |
| 3,874,638 A | 4/1975 | Langlie et al. | |

(Continued)

OTHER PUBLICATIONS

International Search Report in related PCT Application No. PCT/US2010/035592 dated Jul. 20, 2010 (2 pages).

*Primary Examiner* — Robert J Sandy
*Assistant Examiner* — Rowland Do
(74) *Attorney, Agent, or Firm* — Haynes and Boone, LLP; Robert P. Ziemian

(57) ABSTRACT

An apparatus for securing a rope includes a device body having a first width, a first length, and a first height, the first width substantially greater than each of the first height and the first length, the device body having a first end and a second end, the first and second ends at opposing ends of the first width of the device body. The apparatus includes a first rope notch, the first rope notch located at the first end of the device body, the first rope notch extending in a first direction parallel to the first height away from the central body. The apparatus includes a second rope notch, the second rope notch located at the second end of the device body, the second rope notch extending in a second direction parallel to the first height away from the device body, wherein the second direction is opposite the first direction.

14 Claims, 31 Drawing Sheets

(56) References Cited

U.S. PATENT DOCUMENTS

| | | | |
|---|---|---|---|
| 3,930,288 A * | 1/1976 | Black | B66C 1/12 |
| | | | 24/129 R |
| 4,414,712 A | 11/1983 | Beggins | |
| 4,509,233 A | 4/1985 | Shaw | |
| 4,649,664 A | 3/1987 | Mahan | |
| 4,719,668 A | 1/1988 | Cavanagh | |
| 5,131,491 A | 7/1992 | Varner et al. | |
| 5,193,252 A | 3/1993 | Svehaug | |
| 5,339,498 A | 8/1994 | Parsons | |
| 5,463,797 A | 11/1995 | Laug et al. | |
| 5,477,800 A | 12/1995 | Lawrence | |
| 5,519,921 A | 5/1996 | Templer, Jr. | |
| 5,803,390 A * | 9/1998 | Clary | F16G 11/12 |
| | | | 211/119.15 |
| 6,038,746 A | 3/2000 | Anscher et al. | |
| 6,094,783 A | 8/2000 | Parsons | |
| D464,251 S | 10/2002 | Wells | |
| D494,448 S | 8/2004 | Perri et al. | |
| D497,305 S | 10/2004 | Perri et al. | |
| 6,928,704 B2 | 8/2005 | Johnson | |
| 7,428,769 B2 | 9/2008 | Fontaine et al. | |
| 7,464,443 B2 | 12/2008 | Lopes Praca | |

* cited by examiner

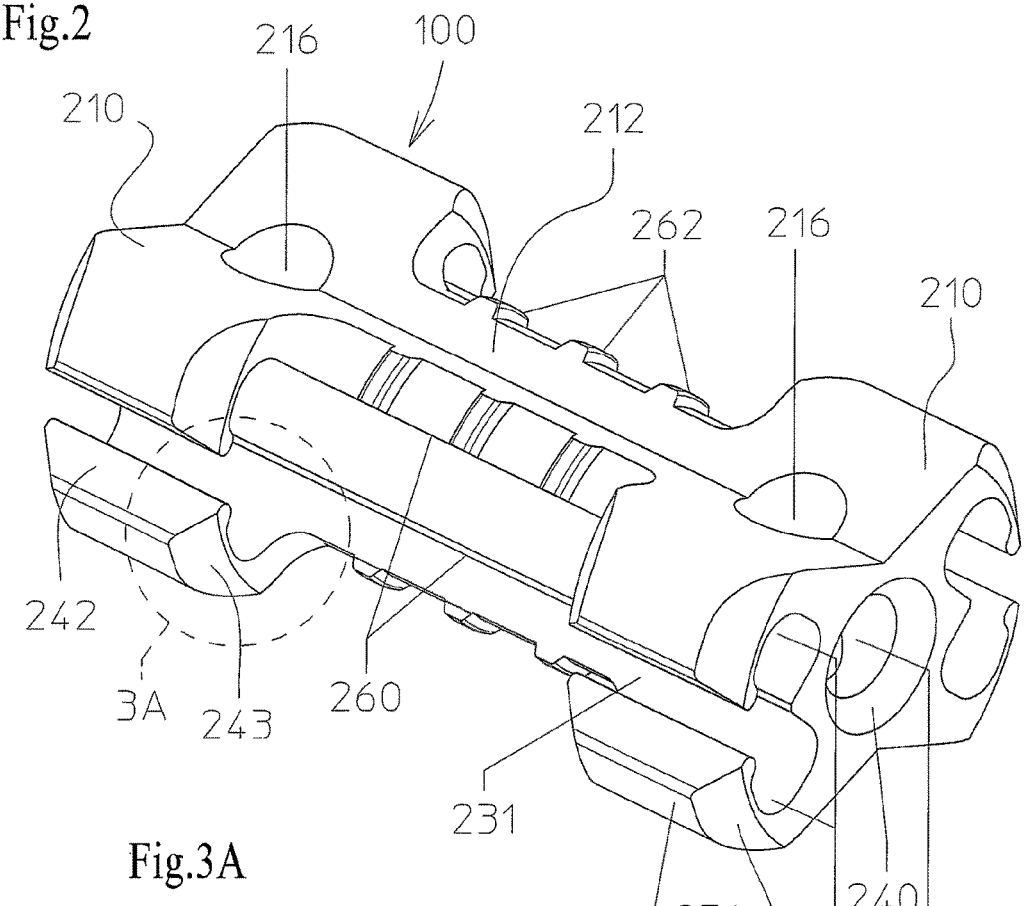
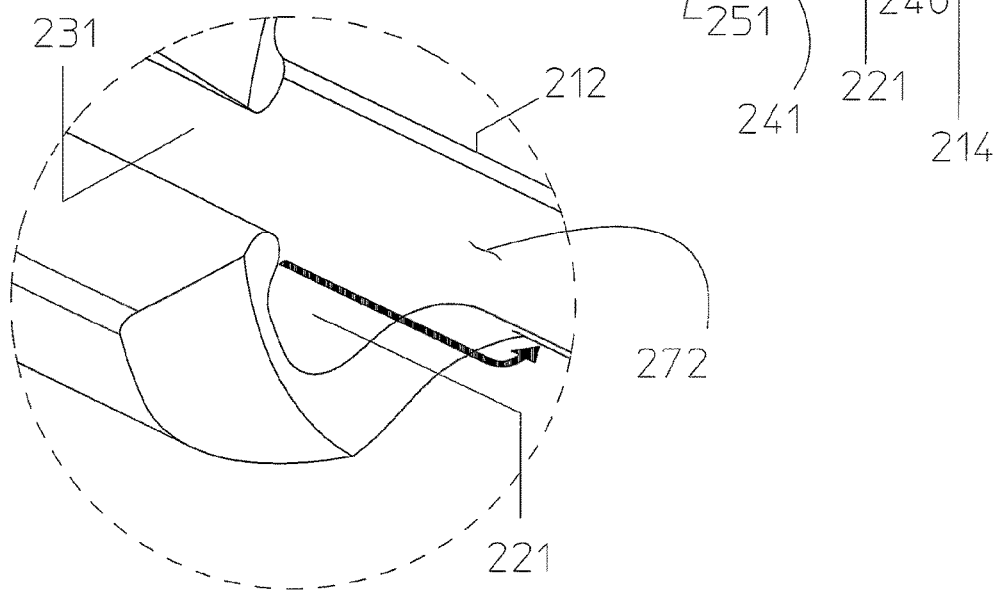

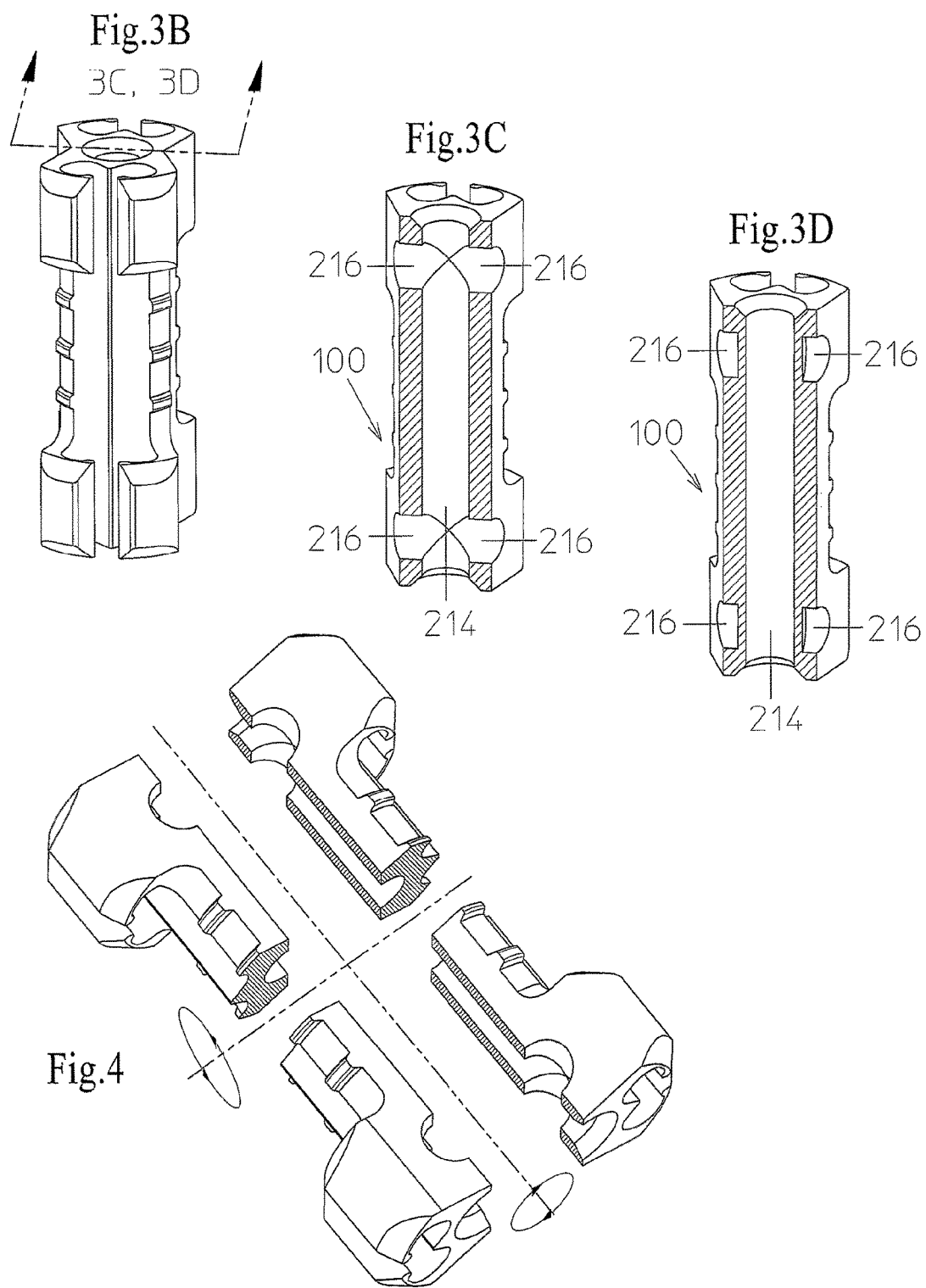

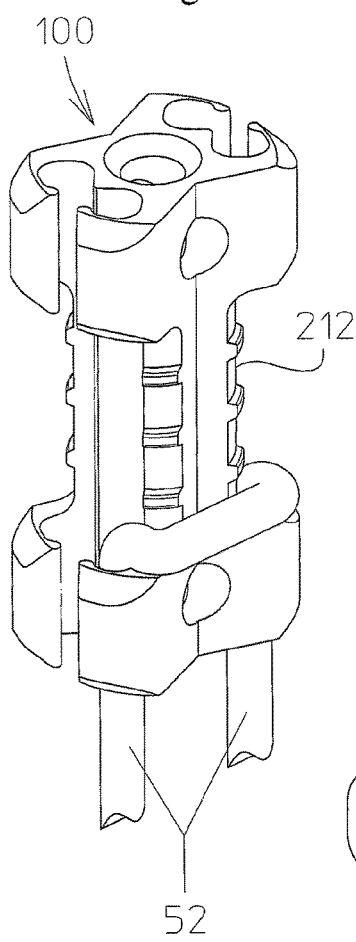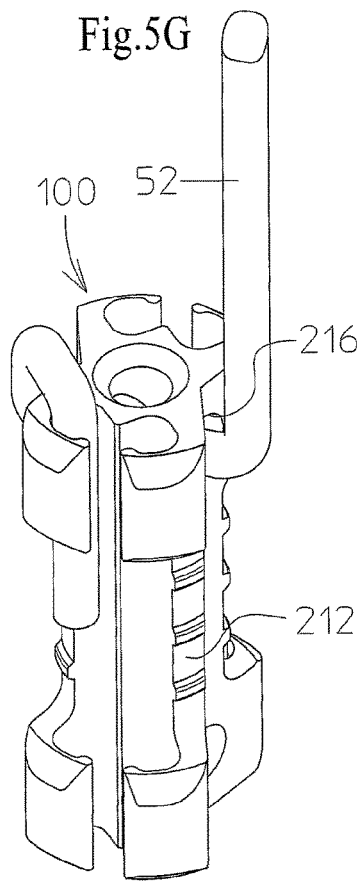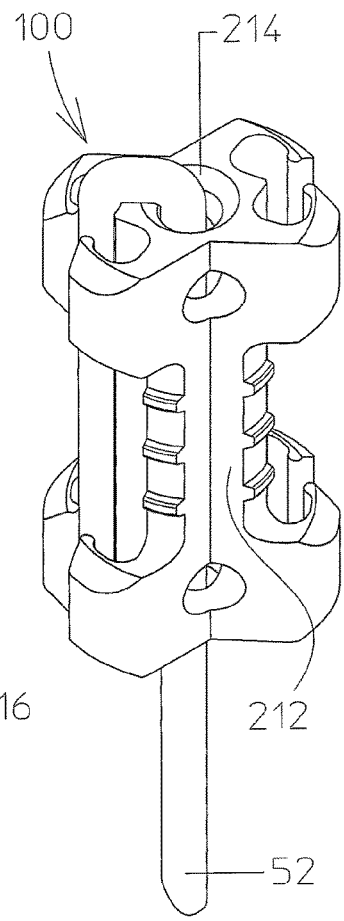

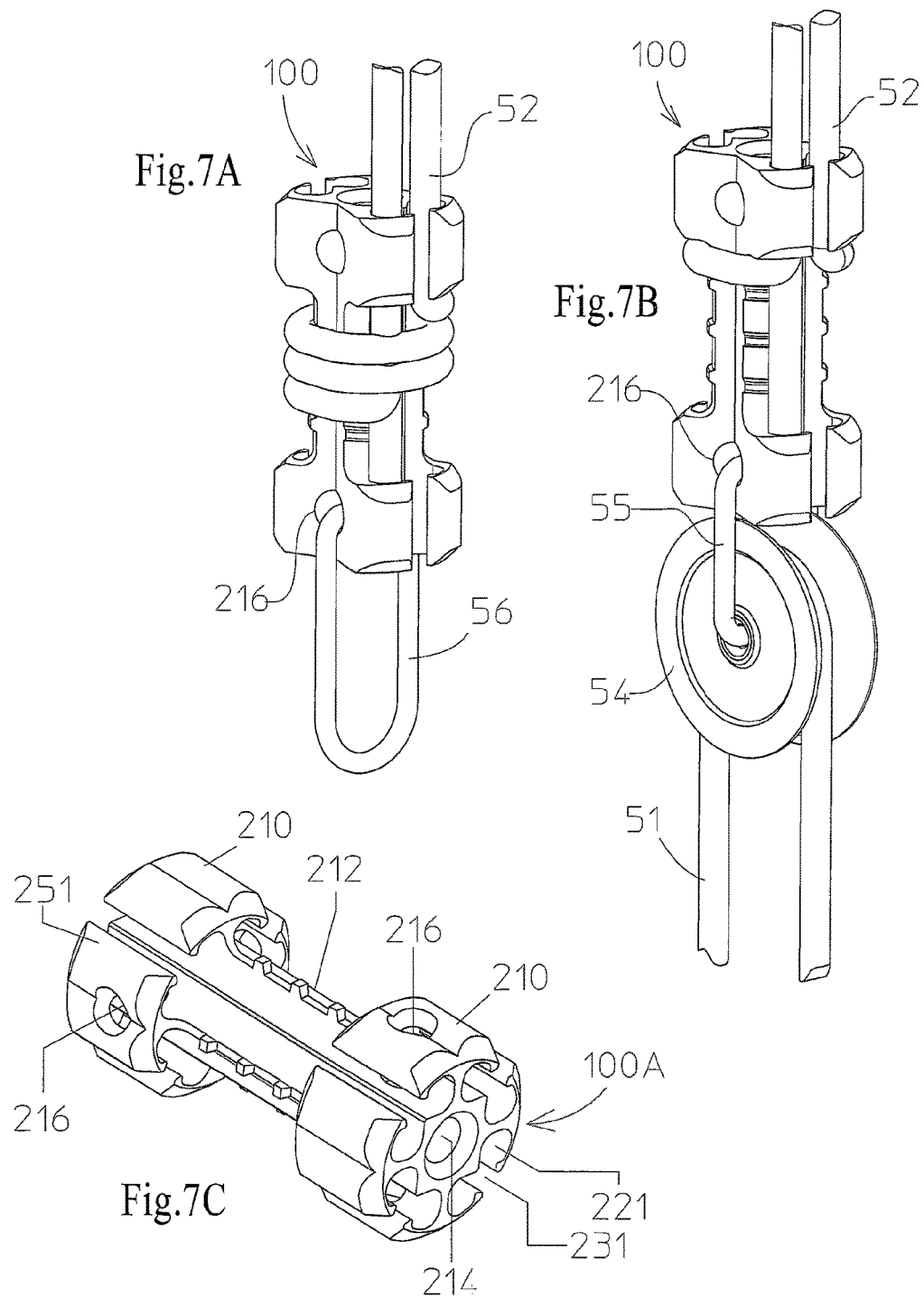

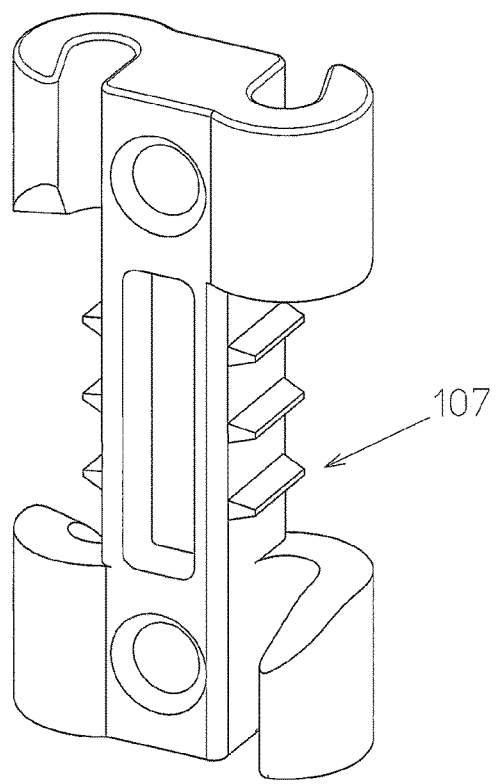
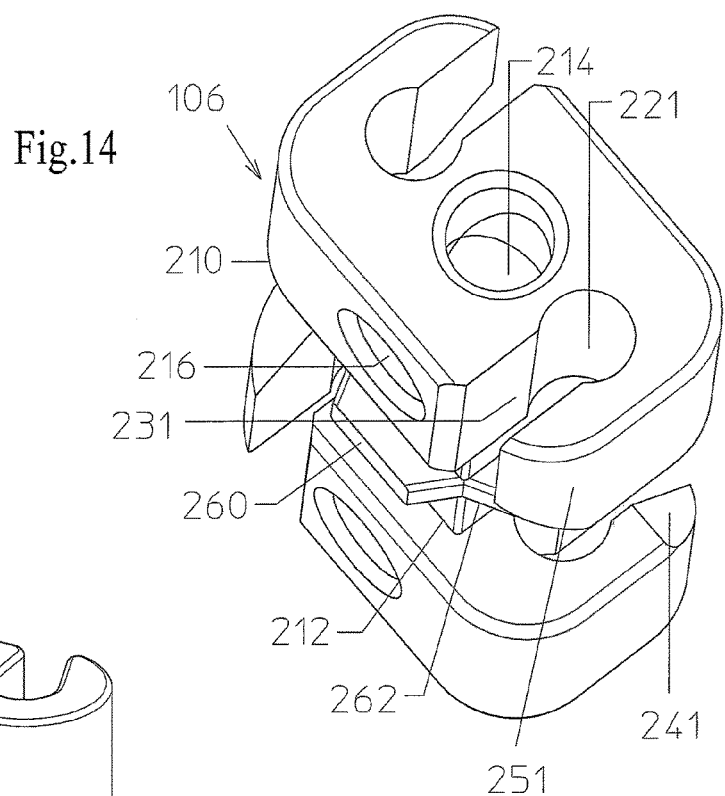
Fig.14
Fig.15

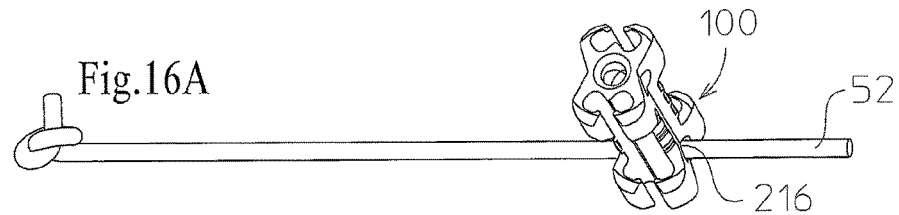
Fig.16A
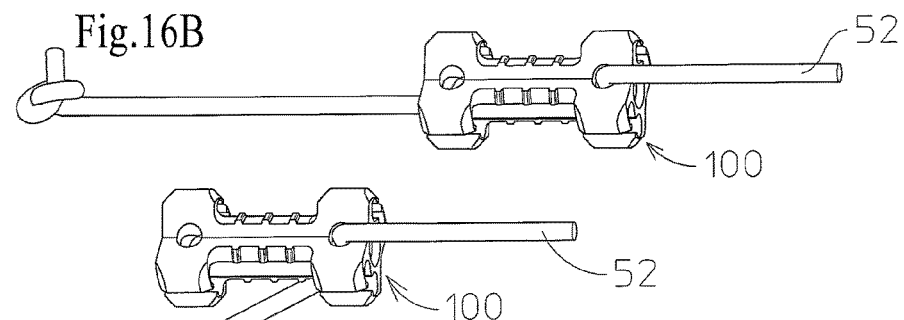
Fig.16B
Fig.16C
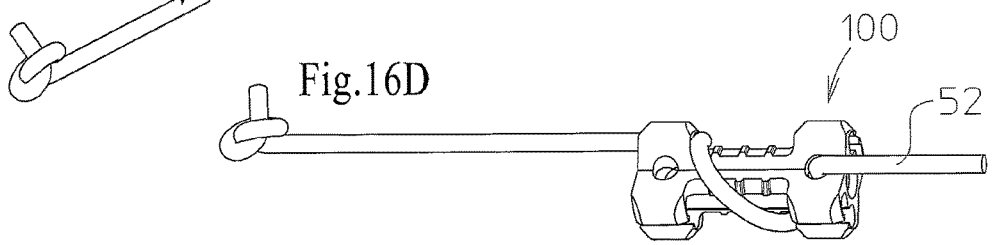
Fig.16D
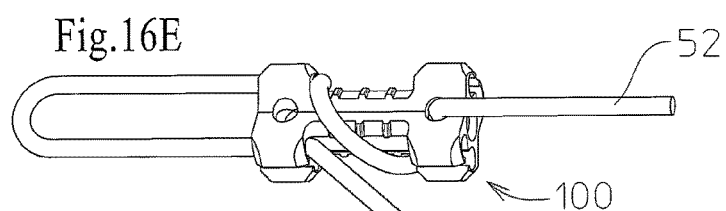
Fig.16E
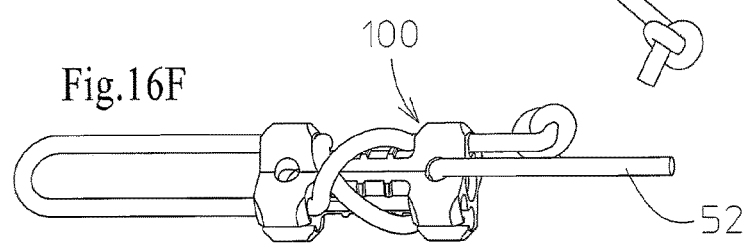
Fig.16F

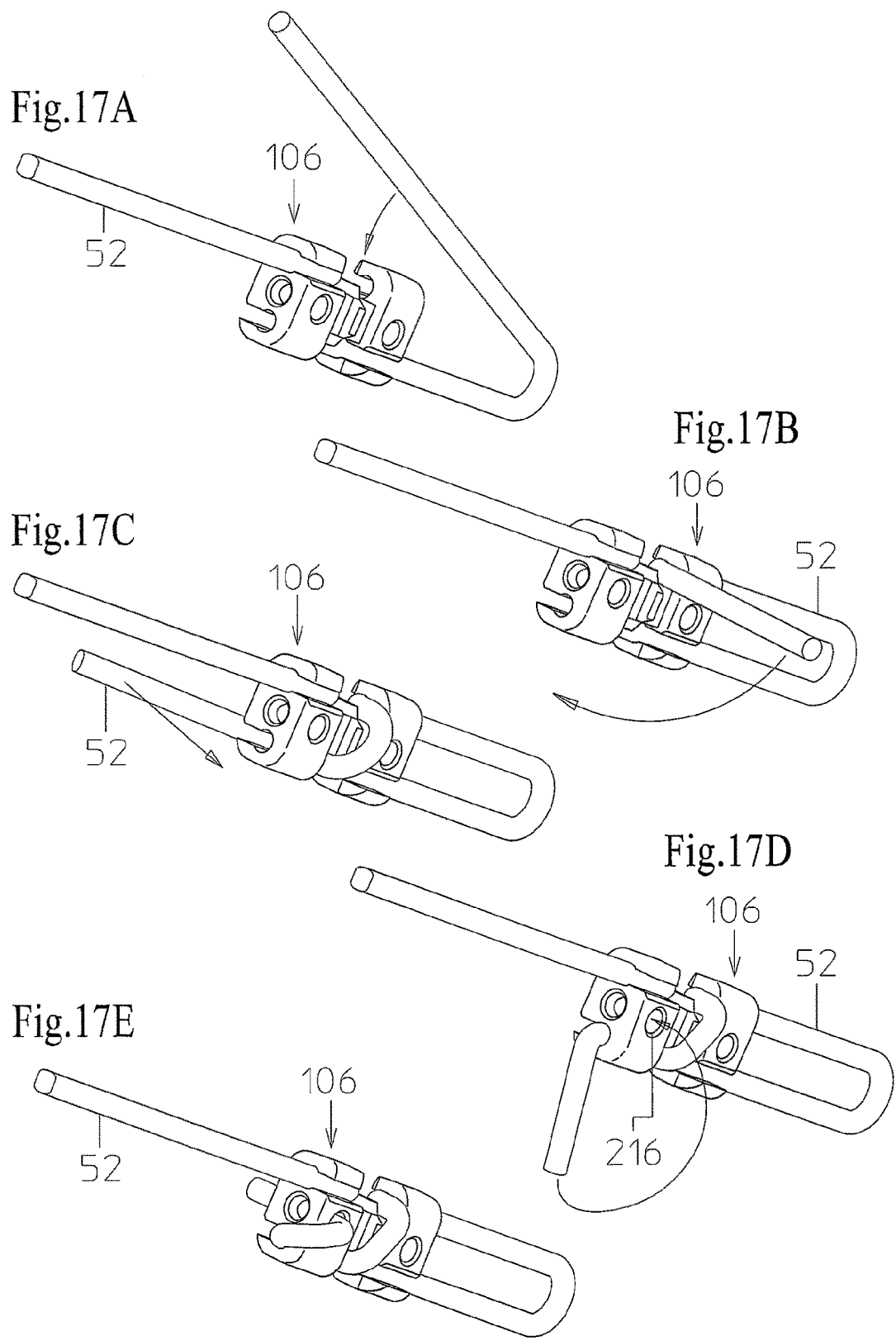

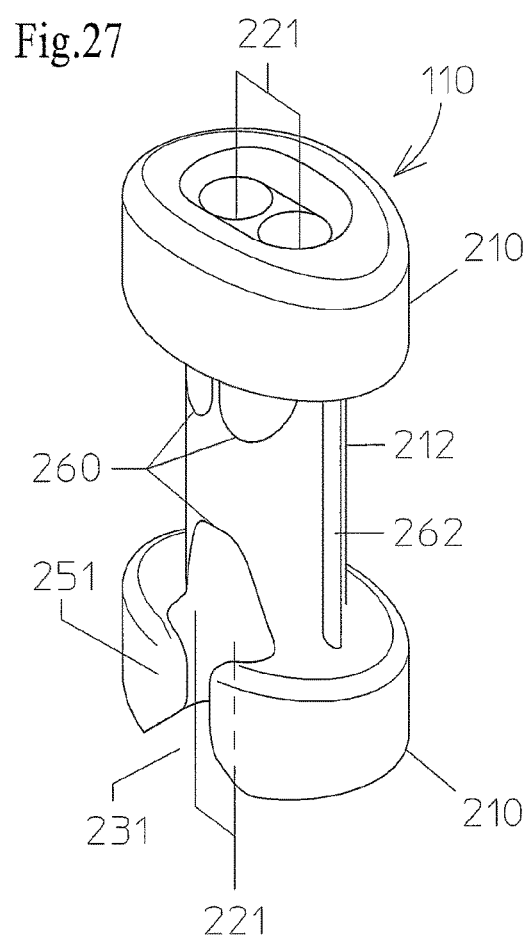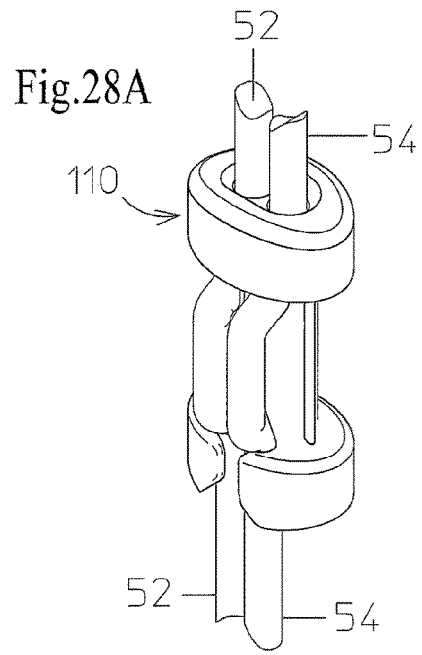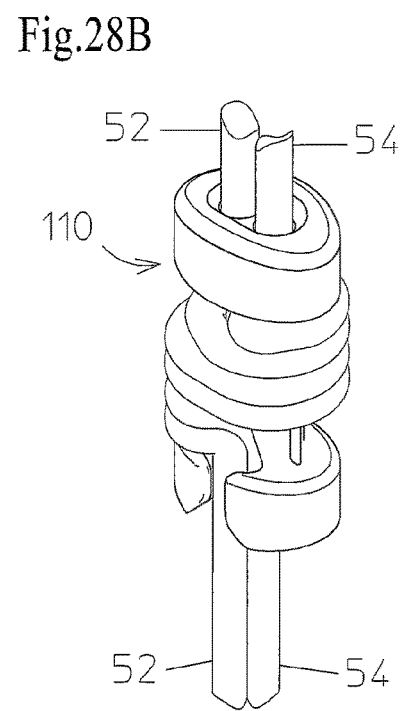

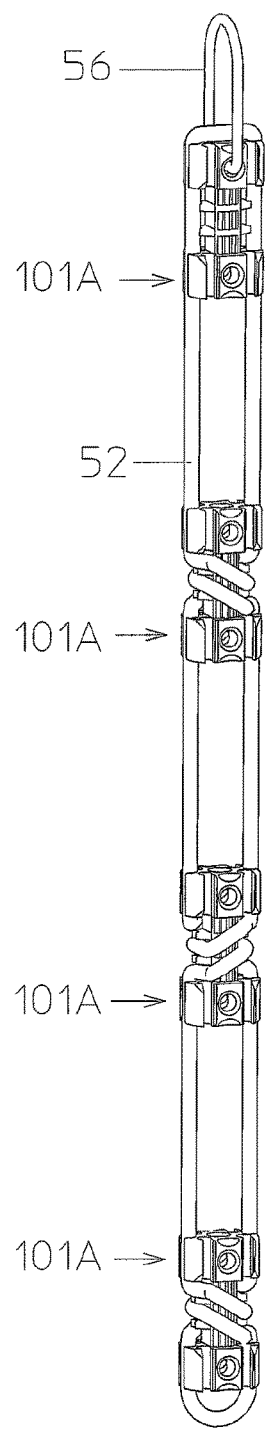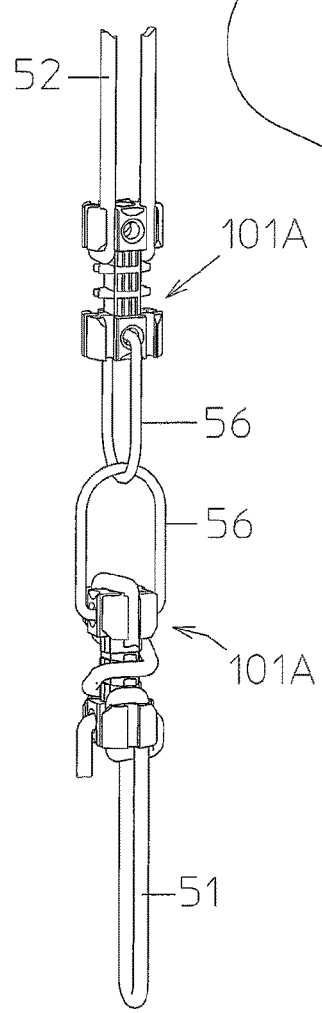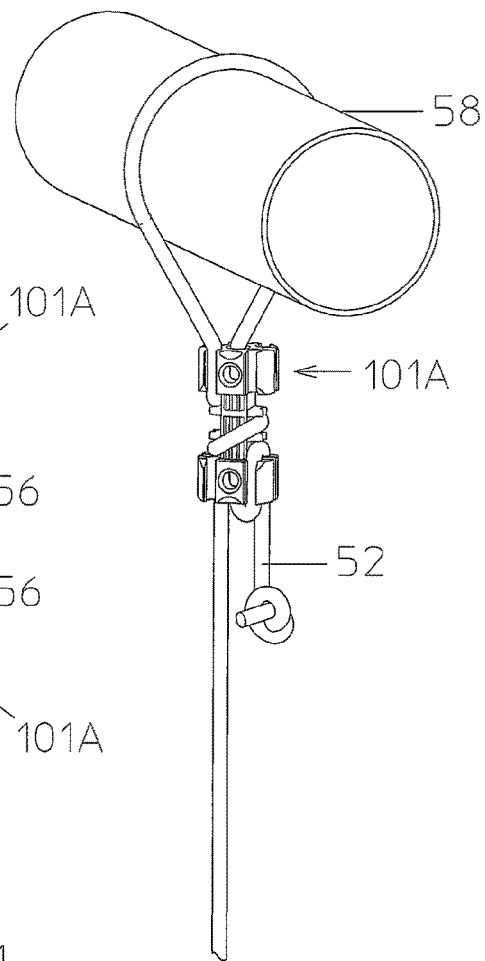

DEVICE FOR SECURING ROPE IN MULTIPLE CONFIGURATIONS AND PROCESS OF USING THE SAME

CROSS-REFERENCES TO RELATED APPLICATIONS

This application is a continuation of U.S. patent application Ser. No. 13/322,308 filed Feb. 8, 2012, now U.S. Pat. No. 9,157,505 issued Oct. 13, 2015, which is a National Stage of PCT Application No. PCT/US2010/035592 filed on May 20, 2010, which PCT application claims the benefit of US Provisional Application No. 61/217,014 filed May 26, 2009. The above-referenced patent applications are hereby incorporated by reference to the same extent as though fully contained herein.

FIELD

This application relates to devices used on ropes, specifically devices used to secure ropes or to secure objects using ropes.

BACKGROUND

Ropes are used for many applications that typically require one or both ends of a rope or multiple ropes to be secured in some manner. In such instances, the ropes are often secured by tying a knot or combination of knots. To address the wide range of variability in an even wider range of applications, many kinds of knots have been developed. There are few people who know how to tie sophisticated or complex knots. Lacking that knowledge, often what results when called to the task of tying knots are either knots inadequate to secure a load or knots that are difficult or impossible to untie.

Efforts to solve this dilemma have resulted in a variety of devices. Some of these devices completely circumvent the need for knots but typically are single function devices quite limited in application and often unable to adjust to varying load conditions. An example would be spring-loaded cinching devices for cords such as U.S. Pat. No. 6,038,746 to Anscher et al. (2000). These types of devices are targeted for use on stuff sacks, luggage, and outer wear; and they are not intended to be load-bearing devices. Other single function devices are rope tighteners such as U.S. Pat. No. 3,874,638 to Langlie et al. (1975) and lock-to-line devices such as U.S. Pat. No. 5,463,797 to Laug et al. (1995). These kinds of devices are niche devices targeted for very specific applications.

In rope securing devices that are intended as general usage load-bearing devices, some form of jam cleat, also known as a wedge cleat or boat cleat, often is used. Examples include U.S. Pat. No. 7,428,769 B2 to Fontaine, Maire (2008); U.S. Pat. No. 6,094,783 to Parsons (2000); U.S. Pat. No. 5,519,921 to Templer, Jr. (1996); and U.S. Pat. No. 4,719,668 to Cavanagh (1988). These items are designed for single rope usage or at best a loop device for a single rope, and require either access to the end of the rope on the non load-bearing side of the device or require removal of the load from the rope and the device in order to release the rope from the device.

Another technique often used for knot replacement is the "tortuous path" technique that usually involves a redirecting or rerouting of the rope through a device. Examples of this style would include U.S. Pat. No. 4,414,712 to Beggins (1983); U.S. Pat. No. 5,477,800 to Lawrence (1995); and U.S. Pat. No. 5,193,252 to Svehaug. Again, they require access to one end of the rope or require a fairly involved install process, are bulky in size, and often are intended to be left in place on a rope.

Other devices have been designed that attempt to incorporate more than one technique in terms of rope restraining features. Examples would be U.S. Pat. No. 2,450,358 to Romano (1945); and U.S. Pat. No. 7,464,443 B2 to Lopes Praca (2008). These devices can be awkward, bulky, or can even catch or snag on surrounding elements and, hence, are not suited for storage with the line such as in the case of a rolled up rain fly or back packing tent.

None of the devices truly replicate the multiplicity in function or the compactness in size afforded through the use of knots.

SUMMARY

The multiple embodiments described herein represent single devices able to accommodate one to multiple ropes under varying load conditions and load directions with adjustable holding force and adjustable rope configurations (in load and no load conditions) that range in function from fixed (static) to cinching, slipping, or sliding connections.

A user of this device can replicate the functionality of knots without tying or knowing how to tie knots. Most rope securing configurations of the device do not require access to the ends of the rope. Additionally, most of the configurations can be implemented anywhere along the length of the rope while the rope remains under load conditions. The device is ideally suited for securing guy lines such as those found on camping tents, rain flies, and other similar applications. Under rope-induced load conditions, the device will align along its longitudinal axis (parallel to the axis of the incoming and outgoing rope) where its load-bearing capacity is highest and its footprint smallest.

The term "rope" as used in these descriptions refers to rope, guy wire, guy line, string, cord, line, or cable. Ropes are not components of this device, but all embodiments of the device are made to act upon ropes. The term "knot" as used in these descriptions can refer to either a knot as is normally tied in a rope or to designate a particular rope configuration using the described device.

In one embodiment, an apparatus for securing a rope includes a device body having a first width, a first length, and a first height, the first width substantially greater than each of the first height and the first length, the rope wrapped around the device body in the plane of the first height and first width, the device body providing frictional forces to the rope, the device body having a first and second end, the first and second end at opposing ends of the first width of the device body. The apparatus further includes a first rope notch, the first rope notch located at the first end of the device body, the first rope notch extending in a first direction parallel to the first length away from the central body, the rope passing from the device body through the first rope notch, the first rope notch holding the rope in the first rope notch. The apparatus further includes a second rope notch, the second rope notch located at the second end of the device body, the second rope notch extending in a second direction parallel to the first length away from the device body, wherein the second direction is opposite the first direction, the rope passing from the device body through the second rope notch, the second rope notch holding the rope in the second rope notch, the rope being held firmly in place by a combination of friction and tension provided by the rope being wrapped around the device body, and the first and second rope notch holding the rope. In one alternative, the first and second rope notch form a first and second void, the first void having a first opening in a third direction, the third direction parallel to the first height, and the second void having a first opening in the third direction. In another alternative, the first and second void have a first cross-section in the plane of the first length and height, the first cross-section having a first shape of a narrowed slot terminating in a semi-circular opening. Optionally, the first cross-section is the same at a plurality of cross-sections along the first and second rope notch in the direction of the first width, forming an approximately tubular semi-circular termination having a first diameter and a slot having a second width less than the first diameter.

In another embodiment, an apparatus for securing a rope includes a means providing frictional forces to the rope; a first means for holding the rope, the first means for holding the rope integrated with a first end of the means for wrapping the rope; and a second means for holding the rope, the second means for holding the rope integrated with a second end of the means for wrapping the rope.

In another embodiment, an apparatus for securing a rope includes a device body having a first width, a first length, and a first height, the first width substantially greater than each of the first height and the first length, the device body having a first and second end, the first and second end at opposing ends of the first width of the device body. The apparatus further includes a first rope notch, the first rope notch located at the first end of the device body, the first rope notch extending in a first direction parallel to the first length away from the central body. The apparatus also includes a second rope notch, the second rope notch located at the second end of the device body, the second rope notch extending in a second direction parallel to the first length away from the device body, wherein the second direction is opposite the first direction. In one alternative, the first and second rope notch form a first and second void, the first void having a first opening in a third direction, the third direction parallel to the first height, the second void having a first opening in the third direction. In another alternative, the first and second void have a first cross-section in the plane of the first length and height, the first cross-section having a first shape of a narrowed slot terminating in a semi-circular opening. Optionally, the first cross-section is the same at a plurality of cross-sections along the first and second rope notch in the direction of the first width, forming an approximately tubular semi-circular termination having a first diameter and a slot having a second width less than the first diameter. Optionally, the tubular semi-circular termination has a tubular radius of approximately a radius of a rope used with the apparatus. In one alternative, the tubular semi-circular termination forms a cylinder in the direction of the first width and wherein the cylinder is open at both ends. In another alternative, the second width is less than a thickness of a rope used with the device when the rope is uncompressed. Optionally, the width of the device body is between 5 to 10 times a width of a rope used with the apparatus. In one alternative, the apparatus further includes a third rope notch, the third rope notch located at the first end of the device body, the third rope notch extending in a third direction parallel to the first length away from the central body, opposite the first direction; and a fourth rope notch, the fourth rope notch located at the second end of the device body, the second rope notch extending in a fourth direction parallel to the first length away from the device body, wherein the fourth direction is opposite the second direction. In another alternative, the apparatus further includes a first borehole, the first borehole passing through the apparatus and device body in a third direction, parallel to the first width. Optionally, the first borehole has a diameter approximately equal to a diameter of a rope used with the apparatus. In one alternative, the apparatus further includes a first borehole, the first borehole passing through the apparatus in a third direction, parallel to the first height. In another alternative, the apparatus further includes a first protrusion, the first protrusion having a trapezoidal shape, a longest base of the trapezoidal shape located on the device body, a first angled side of the first protrusion located facing a first end of the cylinder, wherein such a distance between the first angled side and the first end of the cylinder is approximately a diameter of a rope used with the apparatus.

In one embodiment, a method of securing a rope in an apparatus including a device body having a first width, a first length, and a first height, the first width substantially greater than each of the first height and the first length, the device body having a first and second end, the first and second end at opposing ends of the first width of the device body; a first rope notch, the first rope notch located at the first end of the device body, the first rope notch extending in a first direction parallel to the first length away from the central body; a second rope notch, the second rope notch located at the second end of the device body, the second rope notch extending in a second direction parallel to the first length away from the device body, wherein the second direction is opposite the first direction, the method includes: securing the rope in the first rope notch; wrapping the rope around the device body; and securing the rope in the second notch. In another embodiment, the apparatus further includes a third and fourth rope notch, and the method further includes securing a second rope in the third rope notch; wrapping the second rope around the device body; and securing the second rope in the fourth rope notch. In one alternative, the wrapping includes at least one revolution around the device body.

In another embodiment of a method of securing a rope, the method includes providing a device comprising first and second end sections connected to a center section with said first and said second end sections containing a plurality of cylindrically-shaped voids adjoined to a plurality of open slots; drawing the rope through a first open slot of the plurality of open slots into a first cylindrically-shaped void of the plurality of cylindrically-shaped voids thereby securing the rope in the first cylindrically-shaped void; winding said rope around said center section; and drawing the rope through a second open slot of the plurality of open slots into a second cylindrically-shaped void of the plurality of cylindrically-shaped voids thereby securing the rope in the second cylindrically-shaped void.

BRIEF DESCRIPTION OF THE DRAWINGS

In the drawings, closely related figures have the same number but different alphabetic suffixes. Figures of the same objects viewed from different angles are indentified by a "'".

FIG. 2 shows an isometric view of an embodiment of the rope device of FIG. 1 with reference numerals;

FIGS. 3A-3D show a detail and two section views of the rope device of FIG. 1;

FIG. 4 is an expanded isometric view of an embodiment of the rope device of FIG. 1 sectioned into four quadrants illustrating "quadrant-based-symmetry" (QBS);

FIG. 5F shows a rope routed through the rope device of FIG. 1 in a fixed-link configuration;

FIG. 5G shows a transverse bore being used as an element in the rope path in the rope device of FIG. 1;

FIG. 5H shows a longitudinal bore being used as an element in the rope path in the rope device of FIG. 1;

FIG. 7A shows a rope routed through the rope device of FIG. 1 in a high-force multi-revolution fixed-link configuration with an accessory secured to the device by means of a transverse bore;

FIG. 7B shows a rope routed through the rope device of FIG. 1 in a fixed-link configuration with accessories secured to the device by means of a transverse bore;

FIG. 7C shows an isometric view of an alternate embodiment of a rope device;

FIGS. 9-15 illustrate additional embodiments of a rope device;

FIGS. 16A-16F illustrate guy line sequences using the rope device of FIG. 1;

FIGS. 17A-17E illustrate guy line sequences using the rope device of FIG. 14;

FIG. 27 illustrates an alternative embodiment of a rope device;

FIGS. 28A and 28B illustrate a stuff sack application using the rope device of FIG. 27 with rope in cinch and fixed configurations;

FIGS. 30A-30C illustrate possible device combinations and additional applications;

DETAILED DESCRIPTION

Generally, embodiments of a rope device include a body portion for wrapping the rope around, one or more notches for locking the rope, and, in many alternatives, one or more bore holes through the device. By providing a device with at least one notch and a body portion for wrapping the rope, numerous rope configurations are available to the user.

Figure 1:
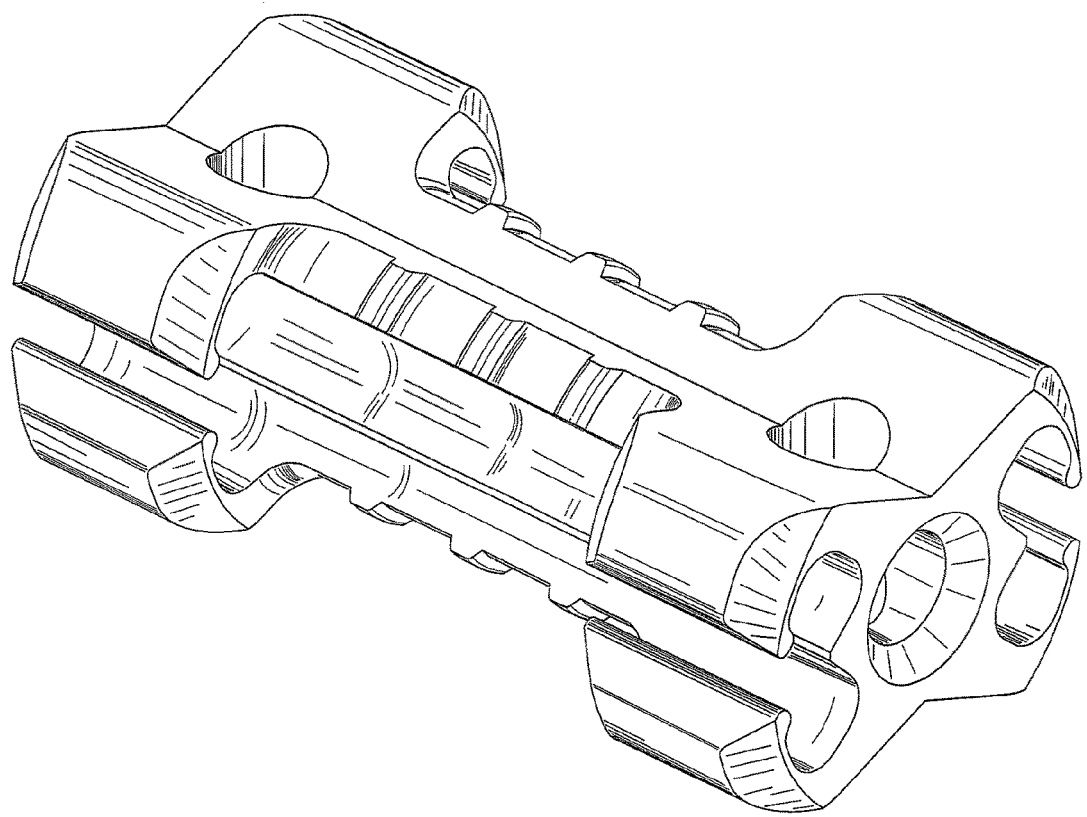
FIG. 1 shows an isometric view of an embodiment of a rope device.

FIG. 1 illustrates one embodiment of a rope device. FIG. 2 shows the labeled components of the embodiment of FIG. 1. FIGS. 3A-3C show an enlarged detail from FIG. 2 and a longitudinal section view of the embodiment of FIG. 1. The embodiment shown has two end sections 210 connected to a center section 212. The center section may also be referred to as "the device body". On the center section 212, grip ridges 260 form raised edges, and path inhibitor tabs 262 protrude outward from opposing surfaces. In each end section 210 are four cylindrically-shaped voids termed "entry-exit pathways" 221. These voids may also be referred to as "notches". In each end section 210, intersecting the entry-exit pathways 221 are two open slots termed "pathway slots" 231. Flex-arms 251 located on the end sections 210 form the sidewalls for the pathway slots 231 and the exterior facing sidewalls for the entry-exit pathways 221. Beveled surfaces 241, 242, and 243 create guided entries into the pathway slots 231. A continuous longitudinal bore 214 extends through both end sections 210 and the center-section 212 along the central axis of the device. A transverse bore 216 extends through each end section 210 perpendicular to and intersecting the longitudinal bore 214 resulting in a single, interconnected void. Located opposite from each pathway slot 231 are the back walls of the entry-exit pathways termed "back surface entry-exit pathways" 272.

Figure 5A:
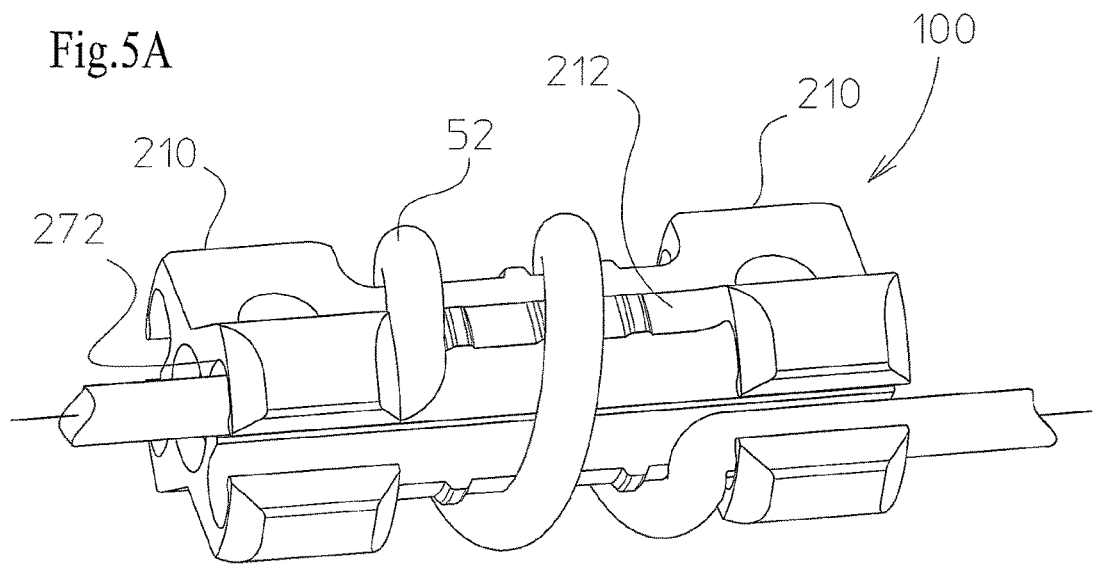
FIG. 5A shows a rope routed through the rope device of FIG. 1 in a fixed rope configuration.
Figure 5B:
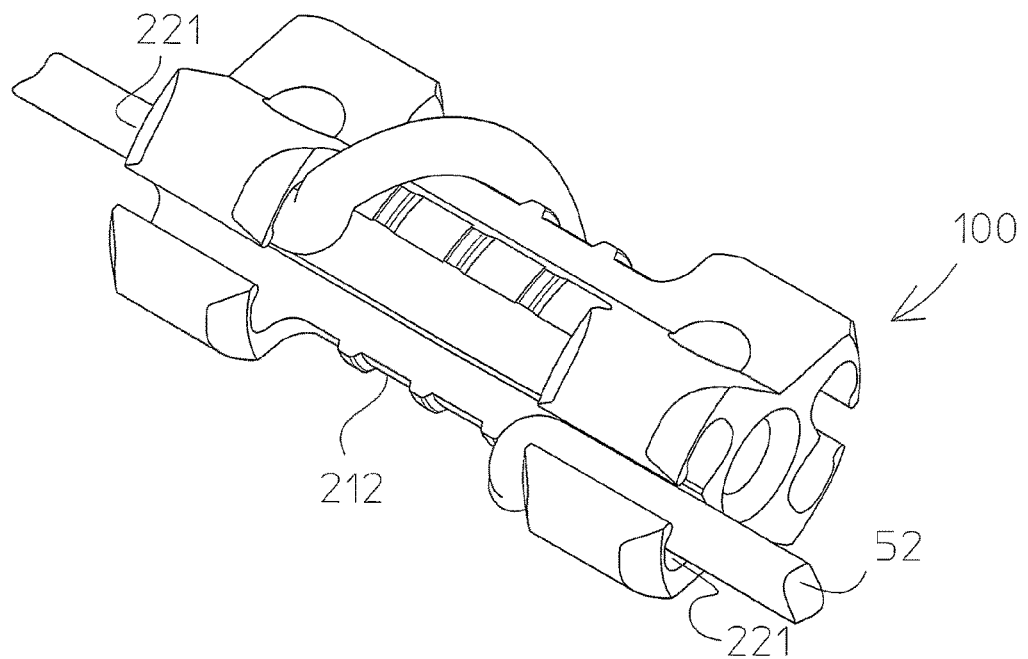
FIG. 5B shows a rope routed through the rope device of FIG. 1 in a fixed rope configuration similar to FIG. 5A except the rope wraps one revolution rather than two revolutions.
Figure 5C:
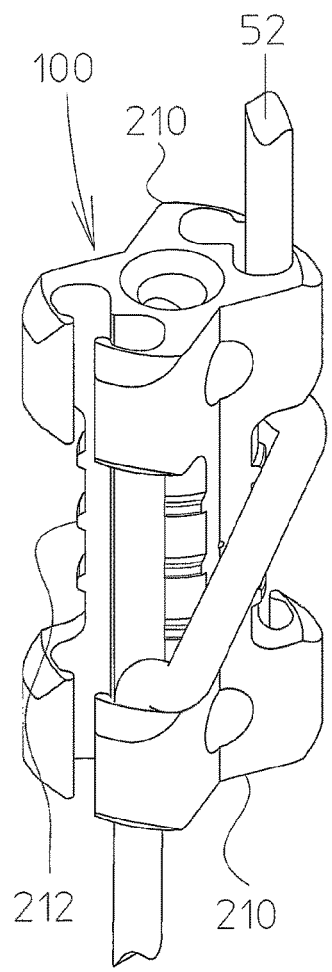
FIG. 5C shows a rope routed through the rope device of FIG. 1 in a half-revolution low-force fixed configuration.
Figure 5D:
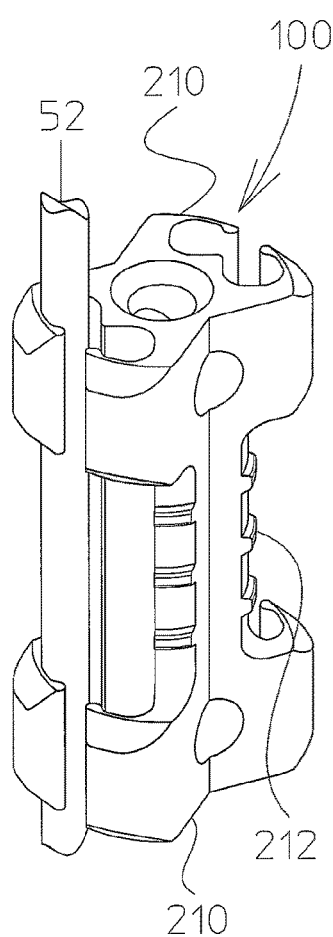
FIG. 5D shows a rope routed through the rope device of FIG. 1 in a cinch (movable) configuration.
Figure 5E:
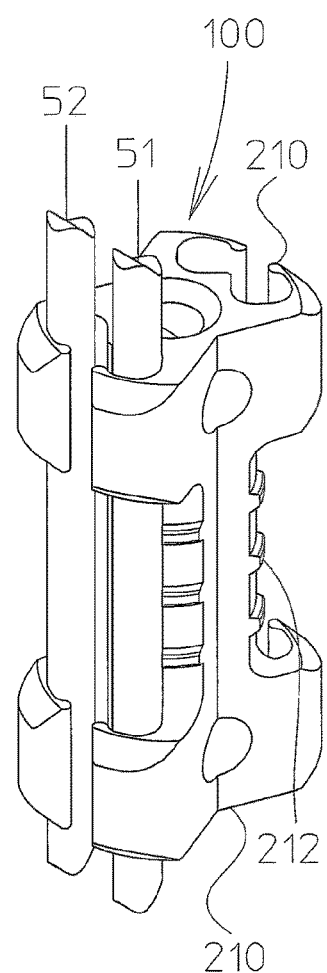
FIG. 5E shows two ropes routed through the rope device of FIG. 1 in a cinch configuration.
Figure 6A:
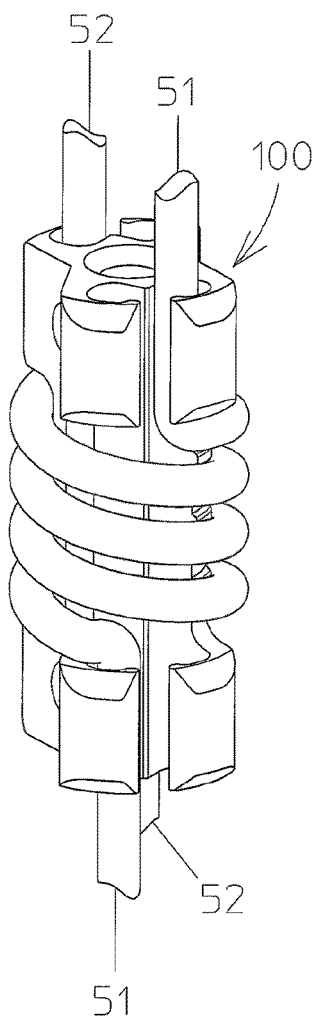
FIG. 6A shows two ropes routed through the rope device of FIG. 1 in a two-revolution same direction high-force fixed configuration.
Figure 6B:
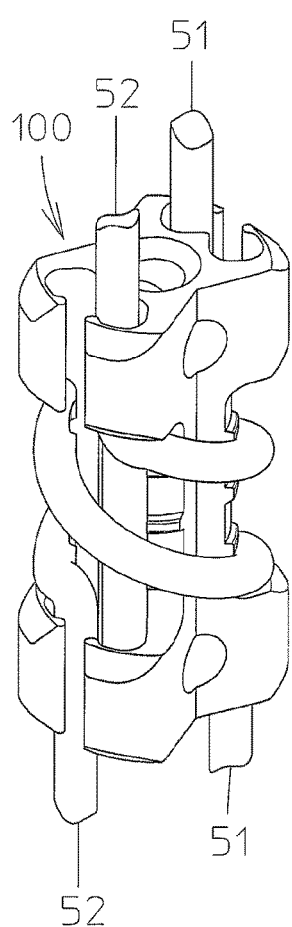
FIG. 6B shows two ropes routed through the rope device of FIG. 1 in a one-revolution same direction medium-force fixed configuration.
Figure 6C:
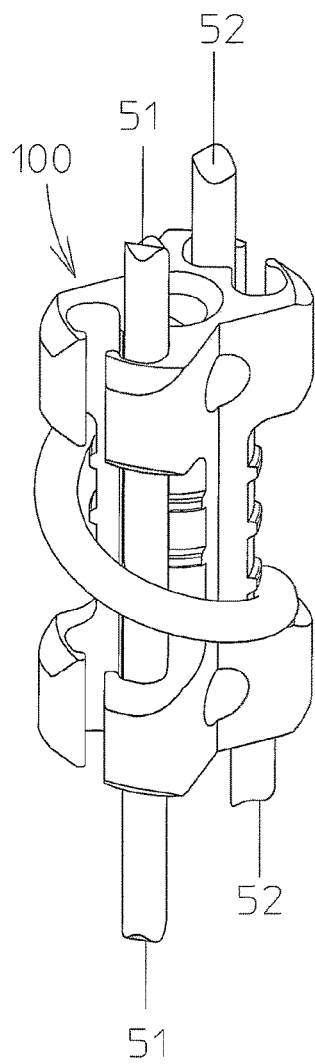
FIG. 6C shows a sliding knot configuration with one rope routed through the rope device of FIG. 1 in a cinch configuration overwrapped by a rope in a one-revolution fixed configuration.
Figure 6D:
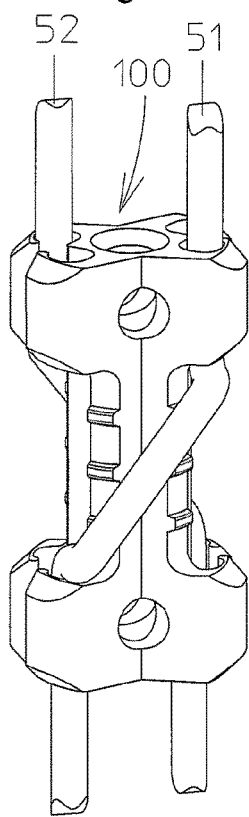
FIG. 6D shows two ropes routed through the device of FIG. 1 in a half-revolution same direction low-force fixed configuration.
Figure 6E:
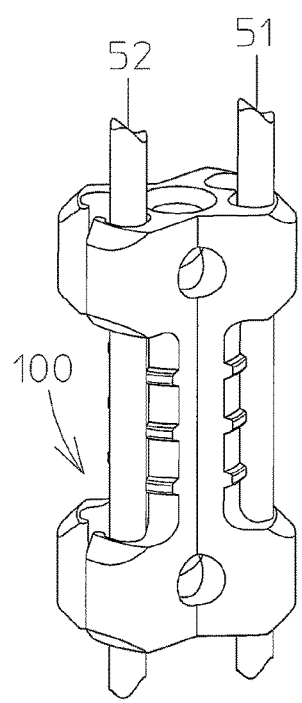
FIG. 6E shows two ropes routed through the rope device of FIG. 1 in a cinch configuration.
Figure 6F:
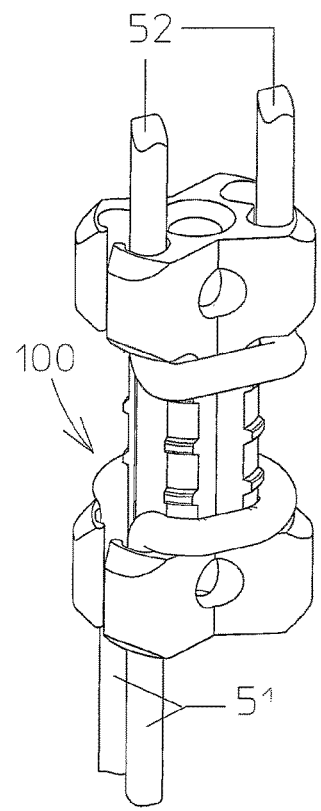
FIG. 6F shows two ropes routed through the rope device of FIG. 1 in fixed-link configurations.
Figure 6G:
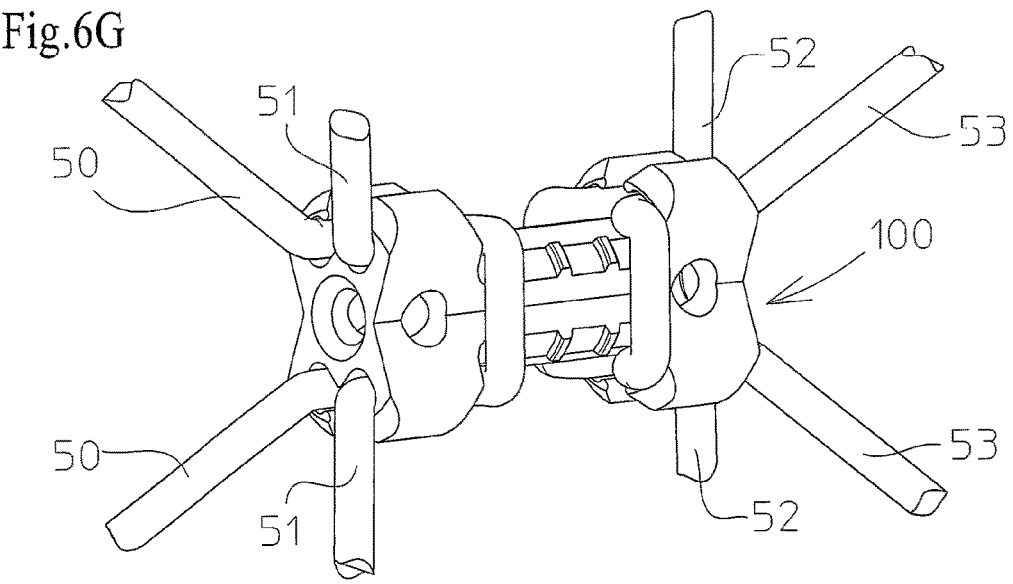
FIG. 6G shows four ropes routed through the rope device of FIG. 1 in fixed-link configurations.
Figure 6H:
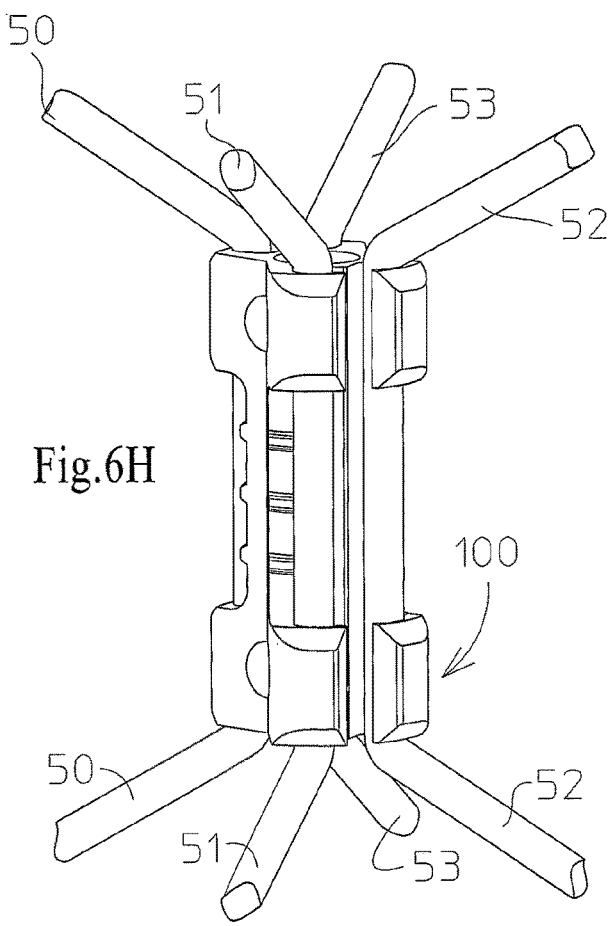
FIG. 6H shows four ropes routed through the rope device of FIG. 1 in cinch configurations.
Figure 6I:
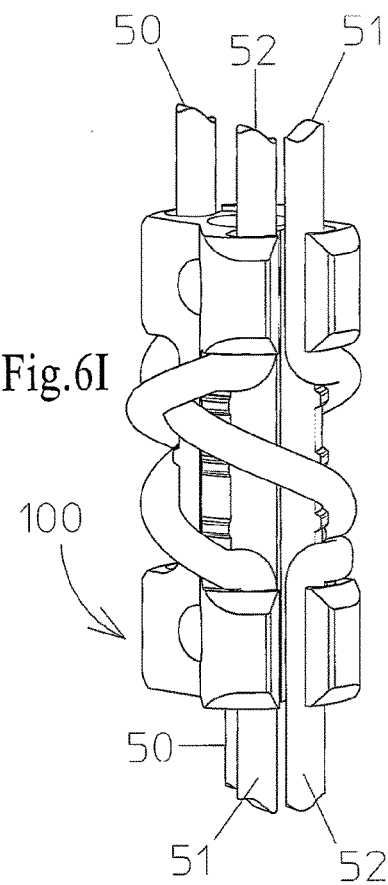
FIG. 6I shows three ropes routed through the rope device of FIG. 1 in fixed configurations.

In using the device, two ends of a rope (or ends of separate ropes) can be fixed into a static or immovable state (FIGS. 6A, 6B); or they may be configured such that one rope remains fixed while the other rope is allowed to move with respect to the fixed rope in a sliding action (FIG. 6C); or they may be configured such that both ropes are simultaneously drawn through the device in a cinching action (FIGS. 5E, 6E). Additionally, the user can control the amount of tension or resistance to movement the ropes experience (ranging from very low to very high) as they move through the device in sliding or cinching actions.

To use the device, a rope is first positioned in one of the entry-exit pathways 221. This is accomplished by inserting the rope into the entry-exit pathway 221 directly (end-on, in a manner similar to threading a needle) or indirectly by pulling the rope laterally through a pathway slot 231 adjoining the entry-exit pathway 221. If the rope is under tension or both ends of the rope are secured to other objects, the device can be pressed onto the rope via the pathway slot 231. The beveled surfaces 241-243 on the exterior edges of the pathway slot 231 assist in aligning the rope along the opening of the pathway slot 231. The opening of the pathway slot 231 is smaller than the diameter of the rope causing the rope to deform and/or the flex-arms 251 to deflect as the rope passes through. The diameter of the entry-exit pathway 221 is nominally sized to match the rope diameter, ensuring that the flex-arms 251 are in a non-deflected state once the rope enters the entry-exit pathway 221 (FIG. 5D).

The entry-exit pathways 221 direct the rope to the center section 212. Upon entering the center section 212 area, the rope is either routed straight through the center section 212 area (to create a cinch "knot" or movable action; see FIGS. 5D, 5E) or is wound one-half half to two revolutions around the center section 212 (to create a fixed knot action; see FIGS. 5A, 5B, 5C).

As the rope is wound around the center section 212, the rope can be routed over or in between the pathway inhibitor tabs 262. The direction the rope is wound around the center section 212 should be such that, as tension is applied to the rope, it is drawn toward the "back surface of the entry-exit pathway" 272 rather than back into the pathway slot 231 (FIGS. 3A, 5A, 5B, 5C). The "back surface of the entry-exit pathway" 272 is located on the side opposite from where the entry-exit pathway 221 connects to the pathway slot 231. When the number of desired revolutions has been completed, the rope is re-introduced into a vacant entry-exit pathway 221 in either end section 210 and then exits the device (FIG. 5A, 7A). Note that different "knot" configurations as well as different embodiments of the device (FIGS. 2, 3, 5A-5F, 9-15, 20, 22, 23, 27) will result in different entry-exit pathways 221 being used in routing the rope out of the device. In many cases, the entry-exit pathway 221 used is oriented such that, as tension is applied to the rope, it will again be drawn toward the back surface of the entry-exit pathway 272 and not into the pathway slot 231 (FIGS. 3A, 5B, 5C). A second rope, multiple ropes, or the other end of the first rope can be secured in the device in a similar manner (FIGS. 6A-6I, 7A, 16F).

The transverse bores 216 can be employed to serve multiple functions which may include the following: to terminate or secure the loose end of the rope (FIGS. 17D, 17E), to serve as one element of the overall rope path through the device (FIG. 16A), and to permanently (or temporarily) attach the device to a rope or to another device (FIGS. 7A, 7B, 16A). If a transverse bore 216 is to be used to terminate or secure the loose end of the rope, the section of rope just outside of the device (as it either enters or exits the device) is threaded through the transverse bore 216 and is either left as is or, for a more secure termination, is threaded through the second transverse bore 216, or secured in a vacant entry-exit pathway 221 after being inserted through the transverse bore (FIG. 5G). The diameters of the transverse bores 216 are larger than the rope diameter.

Figure 8A:
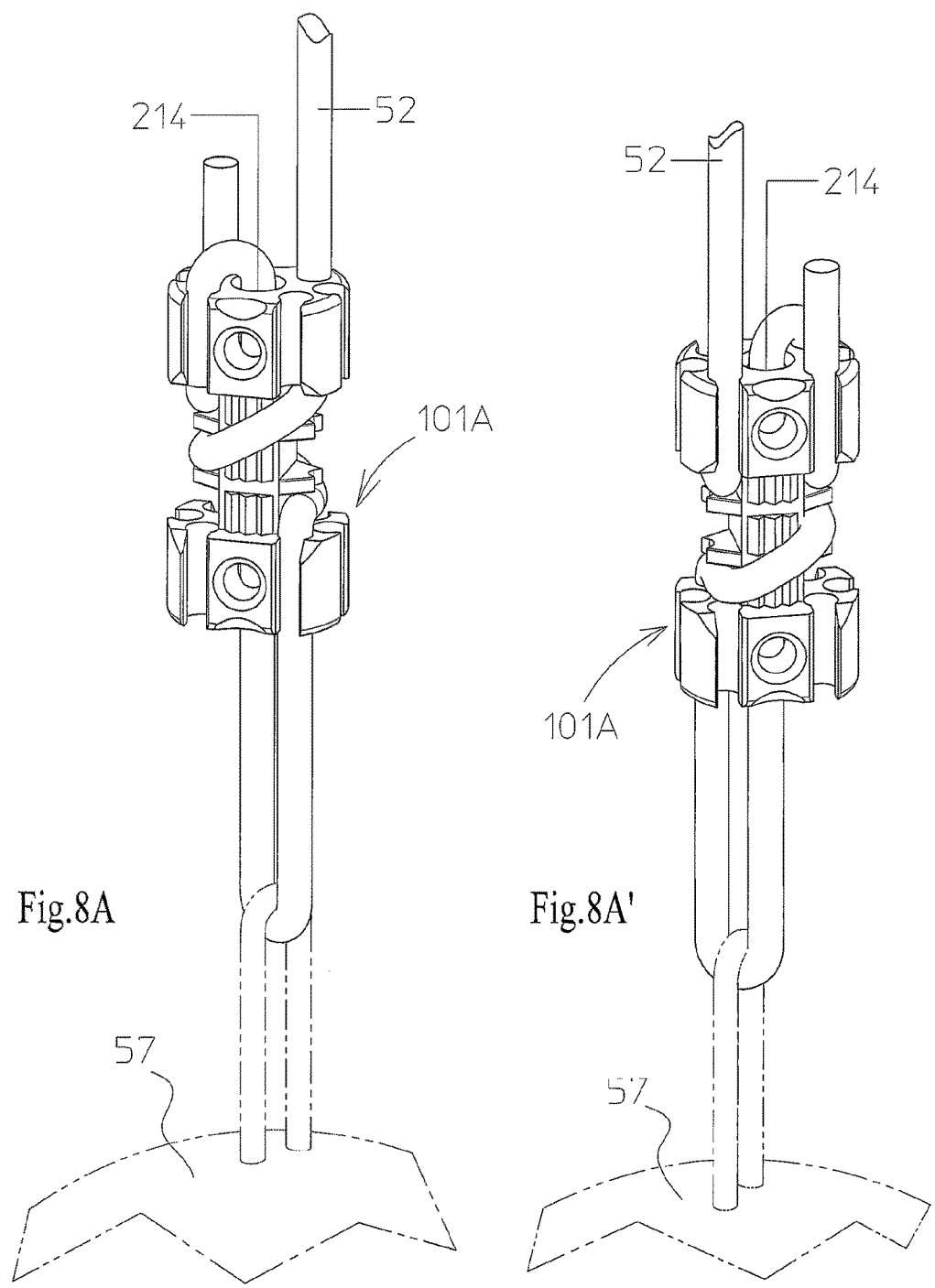
FIGS. 8A and 8A' show a rope routed through the rope device of FIG. 7C securing a simulated load (FIG. 8A' is the backside view of FIG. 8A)
Figure 9:
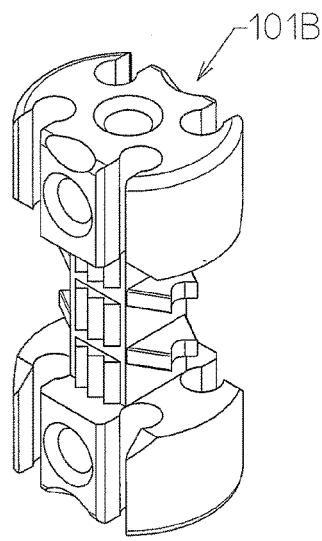
Figure 10:
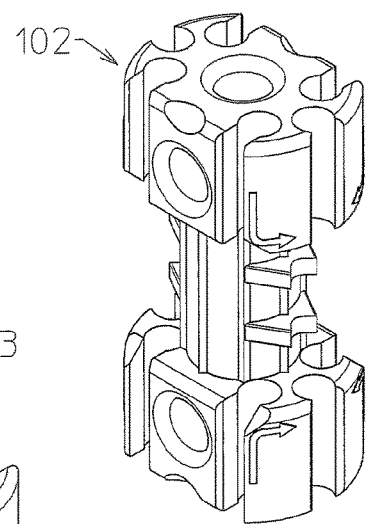
Figure 11:
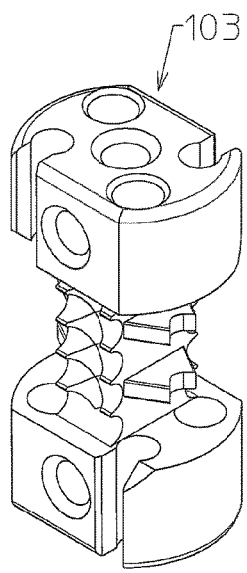
Figure 12:
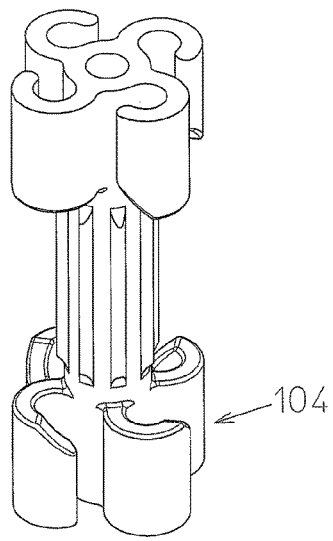
Figure 13:
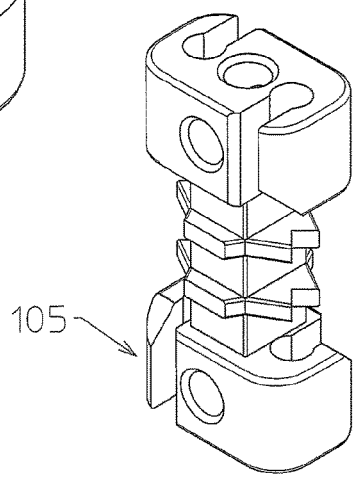
Figure 18A:
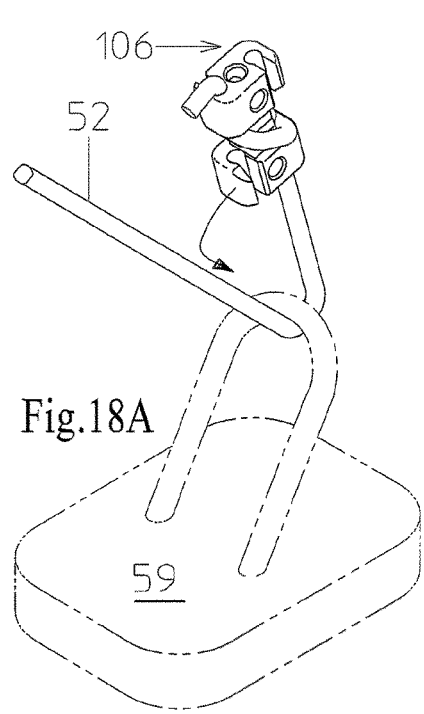
FIGS. 18A-18D illustrate guy line sequences using the rope device of FIG. 14.
Figure 18B:
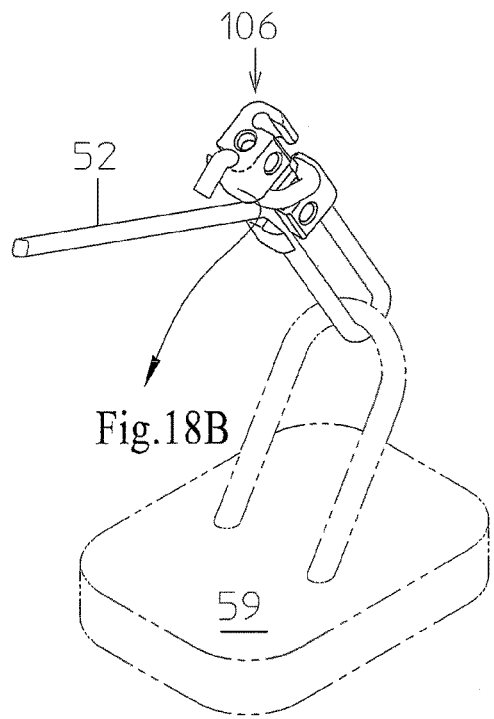
Figure 18C:
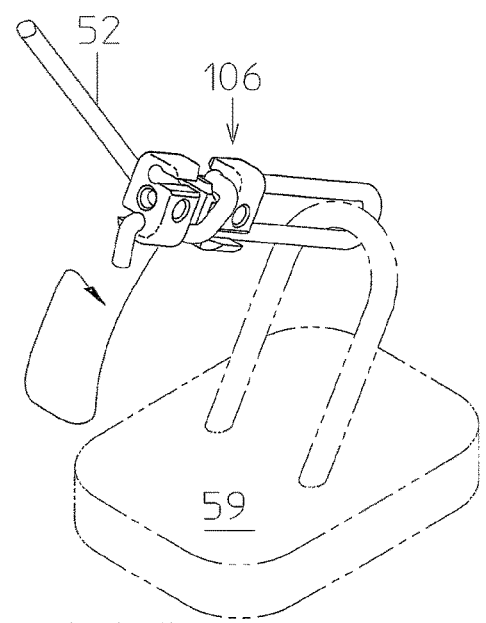
Figure 18D:
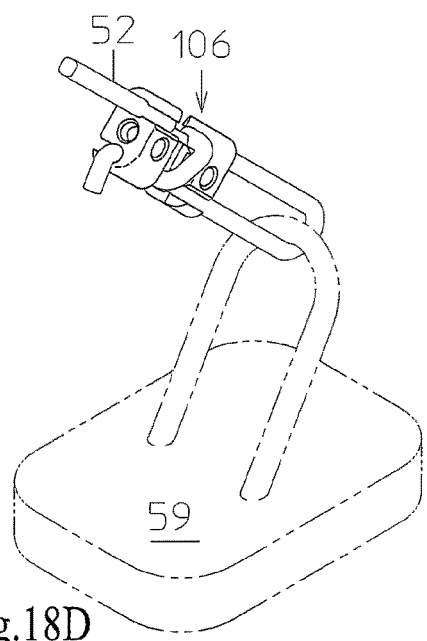

The longitudinal bore 214 can be employed to serve multiple functions which may include the following: to terminate or secure the loose end of the rope, to serve as one element of the overall rope path through the device (FIGS. 5H, 8A, 8A'), and to permanently (or temporarily) attach the device to a rope or other holding device as a means to store or secure the device for later use. A beveled surface 240 may be added at each end of the longitudinal bore 214 to assist in guiding the rope when the longitudinal bore 214 is used as an element of the rope path. The diameter of the longitudinal bore 214 is larger than the rope diameter.

To remove a rope from the device, the rope (or ropes) can be withdrawn directly through the entry-exit pathway 221 (similar to the unthreading of a needle) or withdrawn through the adjoining pathway slot 231. If a pathway slot 231 is utilized to disengage a rope, the direction of travel for the rope will generally be perpendicular to the lengthwise axis of the rope and, hence, perpendicular to any externally applied load force in the rope. This minimizes the effect a load force in the rope will have on the force required to extract the rope from the device. Most of the extraction force results from moving the rope through the narrowed pathway slot 231 past the flex-arms 251. When a rope in the device is under load, it is typically easier to remove the device from the rope. When the rope is slack, it is typically easier to remove the rope from the device.

In either case, the process to disengage the rope from the device using the pathway slot 231 is the same; the rope is drawn transversely outward through the pathway slot 231.

A feature and advantage of this device is that the user has significant control over the restraining force the device imparts to the rope. The restraining force of the device is predominately determined by two factors: the manner in which the rope is routed through the device, and the degree in which external loads applied to the rope are transmitted to the center section 212 of the device. In most situations, the user can adjust both while the rope is under load from external forces. These adjustments usually can be made to the rope in the device without requiring user access to either end of the rope. Thus, the configuration of the rope through the device can be altered from a "fixed" configuration to a "cinch/slip" configuration and back to a "fixed" configuration while the device remains connected to the rope (FIGS. 6H, 6I, 18A-18D).

In principle, the device works by countering or balancing the axially applied external forces in the rope against frictional forces arising from the way the rope is routed through the rope device. When the external load forces are greater than the frictional forces, the rope moves through the rope device. When the load forces are insufficient to overcome the frictional forces, the rope is prevented from moving.

Frictional forces act tangentially between contacting surfaces but are derived from forces acting perpendicular to the contacting surfaces. To configure the rope device in a static or fixed "knot" configuration, the rope is wound around the center section 212 of the rope device. A rope has near zero resistance to bending which results in the axial or tensile force in the rope being redirected (or vectored) radially inward as the rope is wound around the center section 212. This radially directed inward force is the "normal" or perpendicular component of the frictional force. Increases in applied load to a rope wound around the center section 212 of the rope device will cause increases in the normal and friction forces as well.

The action of a rope when wound around the center section 212 of the rope device obeys the "capstan equation for friction over a drum" ($T2=T1e^{\mu\beta}$ where T2 is the friction force, T1 is the load force, $\mu$ is the coefficient of friction, and $\beta$ is the angle of contact force between the rope and the drum). From the equation, it can be determined that the frictional force on the rope depends on only three things:

the tension in the rope;
the coefficient of friction; and
the total angle of contact.

The capstan equation also shows that friction force increases exponentially with increases in the coefficient of friction and increases in the contact angle. Friction force is independent of the contact area, the radius of the bends, and the size of the rope. The coefficient of friction can vary greatly depending on the rope condition: clean/muddy, wet/dry, worn/new, etc. The roughness of rope device surfaces also impacts the coefficient of friction (rougher surfaces typically result in a higher coefficient).

Assuming a typical value of 0.25 for $\mu$ (coefficient of friction), values for the frictional (or holding) force compared to the load force for a rope wound 1.5 revolutions about the center section 212 would be around 10:1, meaning a 60-lb. axial load applied to the rope would only require a 6-lb. frictional force to prevent movement of the rope through the rope device. Because frictional forces increase exponentially, when the rope is wound around the center section 212 2.5 revolutions, the ratio jumps to around 50:1, meaning a 60-lb. load would require only a 1.2-lb. holding force. For 90° bends (¼ revolution), the ratio is about 1.5:1. This last value indicates that the combined contribution of the 90° transitions from two entry-exit pathways 221—into the center section 212 and then out—is approximately a 3:1 advantage in itself. From this, one can readily understand the impact the rope configuration through the rope device has on the overall holding power of the rope device. Small changes in the routing of the rope through the rope device can result in large changes in holding power. The positional relationship between the entry-exit pathways 221 and the center section 212 surfaces ensure that, when the rope exits an entry-exit pathway 221 and is wound around the center section 212, the forces in the rope will behave according to the capstan equation.

In cinch "knot" or movable configurations (FIGS. 5E, 6E, 6H, 28A), ropes run parallel through the center section 212 and move through the rope device rather easily. The center section 212 in combination with the entry-exit pathways 221 serve as the source for the frictional force in the path of the ropes.

In the slip "knot" configuration (one rope fixed, one rope movable, FIG. 6C), the effort required to move the movable rope can be greatly altered by the fixed rope. If the fixed rope is wound over the top of the movable rope as the movable rope passes through the center section 212, then the "angle of contact" between the movable rope and the fixed rope can be dramatically altered. This is particularly so in embodiments where path inhibitor tabs 262 lie directly beneath the movable rope (FIGS. 9-15, 22). Winding the fixed rope tighter and/or increasing the number of revolutions around the center section 212 will deform the path of the movable rope more severely, thereby increasing the angle of contact between the movable rope, fixed rope, and rope device surfaces. In addition, a tighter wound fixed rope will increase the normal forces acting on the movable rope. A similar situation exists when both ropes are in a fixed knot configuration and wound around the center section 212 in opposite directions with respect to each other (FIG. 16F).

Many embodiments include the entry-exit pathway 221 in combination with the center section 212 and/or the path inhibitor tabs 262 to prevent unwanted binding of the secured portion of the rope. When properly positioned in the entry-exit pathway 221, the rope can be disengaged from the rope device in either favorable or adverse conditions or when the rope is in a loaded or non-loaded state. When wet, a conventional knot can be difficult to near impossible to untie even when all load forces have been removed. Many embodiments of the rope device avoid tying ropes together, thereby minimizing the possibility of that occurring.

Figure 25:
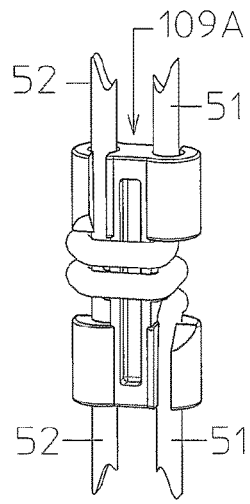
FIG. 25 shows a sliding knot configuration with one rope routed through the rope device of FIG. 20 in a cinch configuration overwrapped by a rope in a two-revolution fixed configuration.
Figure 26A:
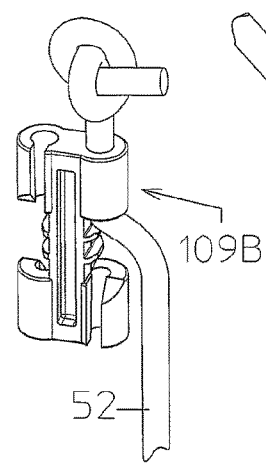
FIGS. 26A-26B illustrate guy line applications using the rope device of FIG. 23.
Figure 26B:
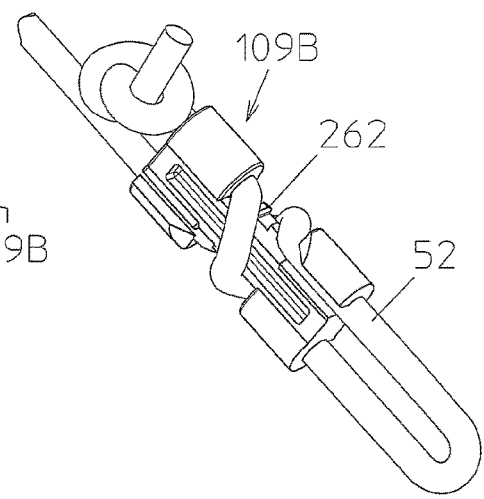
Figure 29A:
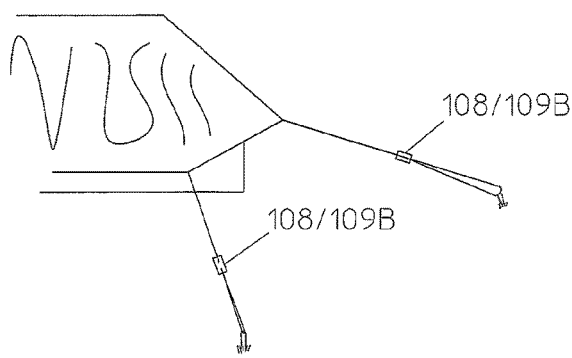
FIGS. 29A-29E illustrate possible applications utilizing various device embodiments.
Figure 29B:
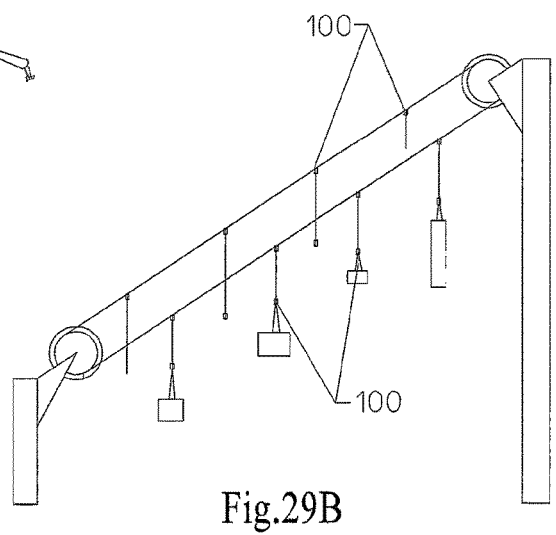
Figure 29C:
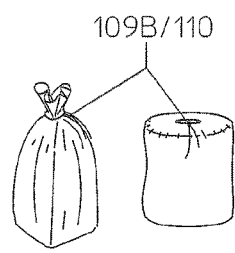
Figure 29D:
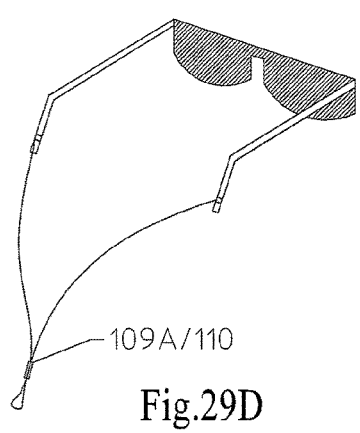
Figure 29E:
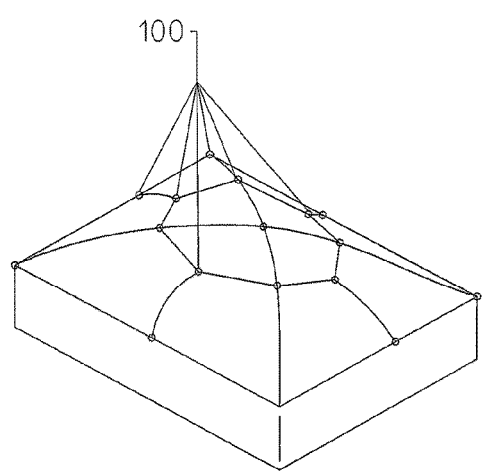

For many embodiments of the rope device, the primary means for limiting unwanted disengagement of a rope from the rope device rely on the rope being properly positioned in the entry-exit pathways 221. For fixed roped configurations, the immediate bend the rope undergoes as it exits the entry-exit pathway 221 in its route around the center section 212 also assists in keeping the rope properly positioned (FIG. 5A). For those configurations where at least one rope is not wound around the center section 212 (slip and cinch, FIGS. 6C, 25, 5E, respectively), geometry details along the surfaces of the center section 212 in combination with the entry-exit pathways 221 assist to keep the rope positioned appropriately. For applications that experience moderate to light loads only (closure for a small stuff sack), the entry-exit pathways 221 alone are sufficient to keep the rope properly positioned in the rope device. In certain embodiments of this rope device (by means of the transverse bores 216, FIGS. 5G, 17E), the loose or free end of the rope can be secured at the point the free end exits the rope device. Securing the loose or free end of a rope provides additional support in limiting inadvertent or unwanted disengagement.

Figure 19:
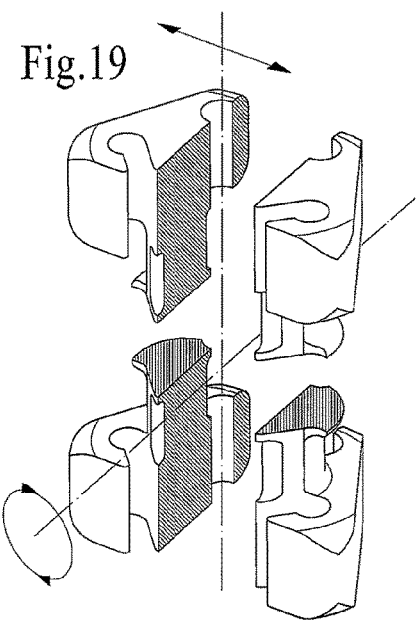
FIG. 19 is an expanded isometric view of an alternative embodiment of a rope device sectioned into four quadrants illustrating "quadrant-based-symmetry" (QBS)
Figure 20:
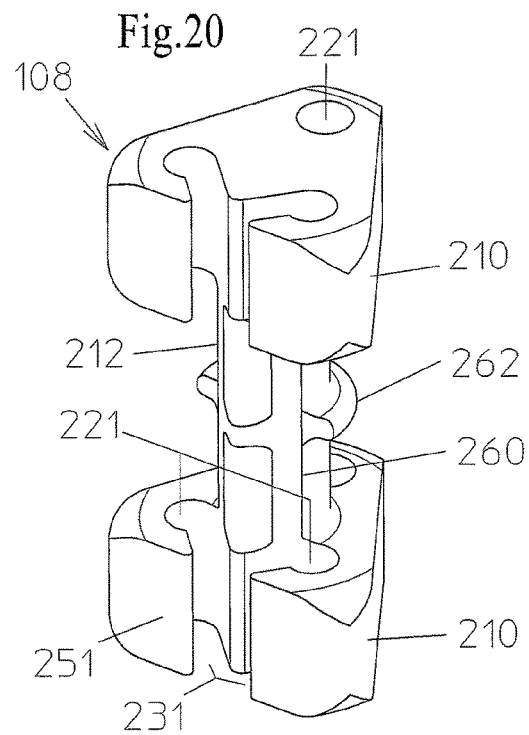
FIG. 20 shows another view of the rope device of FIG. 19.
Figure 21:
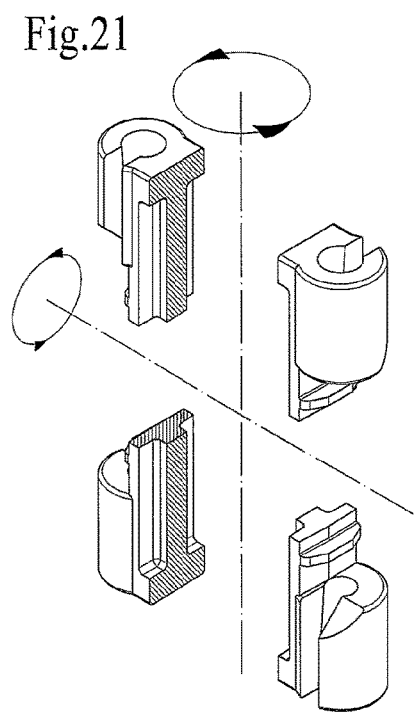
FIG. 21 is an expanded isometric view of an alternative embodiment of a rope device sectioned into four quadrants illustrating "quadrant-based-symmetry" (QBS)
Figure 22:
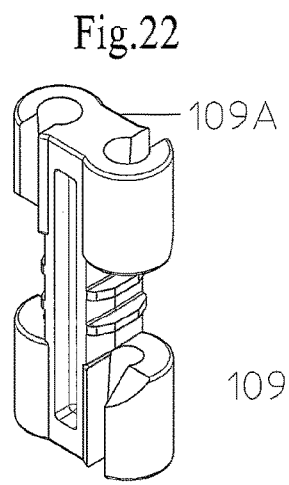
FIGS. 22 and 23 show another view of the rope device of FIG. 21.
Figure 23:
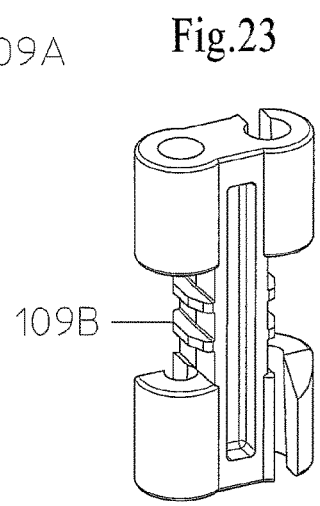
Figure 24A:
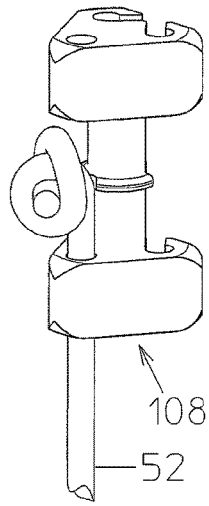
FIGS. 24A-24D illustrate guy line applications using the rope device of FIG. 20.
Figure 24B:
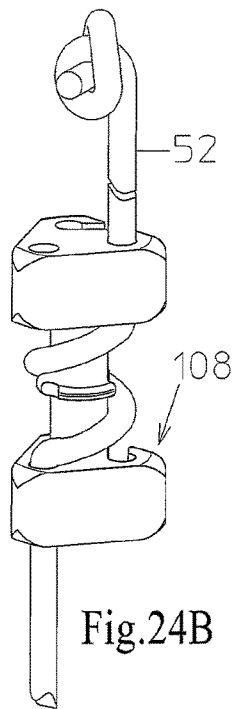
Figure 24C:
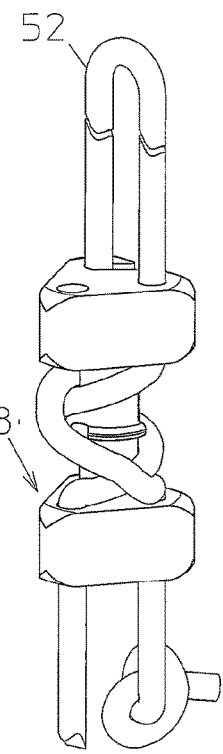
Figure 24D:
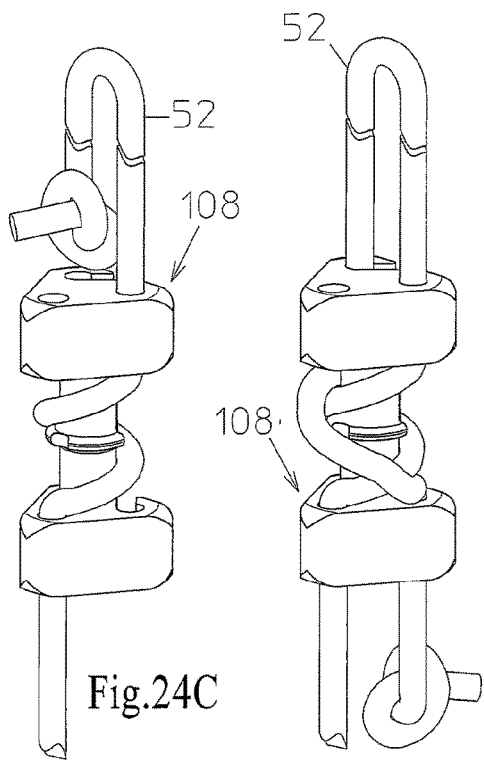

The rope device in many embodiments is a single part utilizing "QBS"-generated features. The term "QBS" refers to "quadrant-based-symmetry" and is a symmetry in the rope device created by replicating specific part geometries from one quadrant or quarter-section of the rope device to one or more of the remaining quadrants. Quadrant-based-symmetry can either be the result of a "mirroring" across a quadrant boundary or the result of a "rotation of 180°" about a quadrant boundary (FIGS. 4, 19, 21). In terms of the claims made for this rope device, the "QBS" features of different embodiments of the rope device function equivalently irrespective of visual differences (FIGS. 7C, 9-15, 20, 22, 23, 27). FIG. 1 illustrates one embodiment of the rope device. It is a unique case of a "QBS"-featured rope device in that the part geometries that result from mirroring quadrants are identical to the part geometries that result from rotating quadrants—functionally and visually. The "QBS"-generated features in the rope device enable key functionalities of the design to be replicated in such a manner that those functionalities remain intact independent of rope device orientation. This greatly enhances the ease-of-use aspects of the design and is an important distinction in terms of delineating the unique nature of the rope device.

The design is scalable to accommodate different rope diameters and different rope materials.

Required rope device size for a given rope diameter would be comparable to that of a large knot of medium complexity tied in the rope. For specific applications, rope retention forces could be optimized by varying individual geometries, particularly those of the center section 212, grip ridges 260, and the path inhibitor tabs 262 (FIGS. 9-15).

The rope device is produced from a variety of materials utilizing different manufacturing processes. Alternative materials include thermoplastics (with or without glass fibers), thermoset resins, metals, and metal alloys. Alternative, manufacturing processes include the use of injection molds, die castings, extrusions combined with secondary machining operations, or CNC machining methods. A "QBS-featured" rope device is suited for injection molds and extrusions. Injection molds are not inexpensive, but they are very durable and can produce accurate detailed parts. In sufficient quantities with tooling costs amortized over the lifespan of the mold, per part costs can be very low. Additionally, interchangeable inserts incorporated into the design of a mold would allow selective expression of specific entry-exit pathways 221 and/or pathway slots 231. This extends the benefits of high-volume tooling across a large selection of embodiments of the rope device. Extrusions require a minimal tooling investment, particularly when compared to the costs required to produce injection molds. Using automated feed, cut-off, and in-line CNC machining, individual part costs can be made competitive to those achieved with injection molds. The embodiments shown in FIGS. 1, 7C, and 20 are particularly well suited to the extrusion process.

Figure 31A:
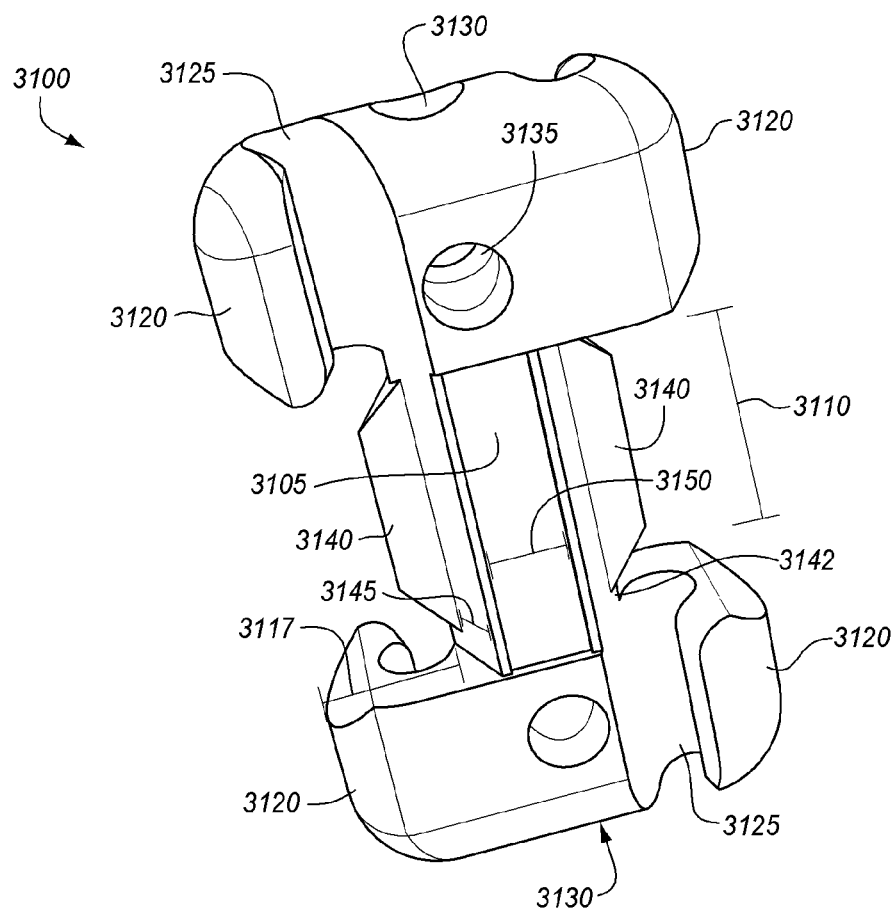
FIG. 31A shows one embodiment of a rope device.

FIG. 31A shows another embodiment of a rope device 3100. Rope device 3100 is substantially similar to the rope device of FIG. 15, except in rope device 3100 the protrusions 3140 on the device body are different and opening 3130 has been added. The central portion of the device body 3105 has a width 3110, a height 3145, and a length 3150. The width 3110, height 3145, and length 3150 are proportioned based on the rope used with the rope securing device. For instance, with rope of cord size 2 MM to 3.5 MM, the width is approximately 10 mm, the length is approximately 5 mm and the length is approximately 5 mm. Various alternative sizes are possible. In one alternative, the dimensions are proportional to the rope or cord. In one alternative, the width 3110 is between 3 to 6 times the width of the cord. This configuration allows the rope to be wrapped approximately 3 times around the height 3145 and length 3150 from one end of the rope securing device to another.

The rope securing device 3100 of FIG. 31A further includes a first, second, third, and fourth rope notch 3120. The notches 3120 extend away from the device a distance 3117; this distance is approximately the thickness of rope, plus a distance for the material thickness, although in alternatives, the distance 3117 may vary. Although the embodiment show in FIG. 31A includes four rope notches 3120, various alternatives are possible, including but not limited to one or more rope notches. In one alternative, the rope securing device includes at least two rope notches 3120. This configuration allows the rope or cord to be notched on both sides of the width of the rope securing device. The rope notches 3120 terminate in a semi-circular opening 3125 that interconnects with a slot 3127. The semi-circular opening in 3125 is approximately the width of the intended rope. The slot 3127 is less than the width (or radius) of the intended rope. The slot 3127 is a width that, when a force is applied to the rope in the direction of the semi-circular opening 3125, the rope deforms or stretches and snaps or passes to the semi-circular opening. The narrow portion of the slot 3127, therefore, prevents the removal of the rope, keeping it locked down in position. As shown in FIG. 31A, notches 3120 on the length 3150 width 3110 diagonal face the same direction. This is useful alignment, since it allow for the rope to be locked down on opposite sides of the device, providing for maximum hold as compared to other arrangements.

The rope securing device further includes grip features or protrusions 3140. These protrusions 3140 provide for additional tension on the rope by virtue of the notches formed on either edge of protrusions 3140. When the rope is pulled against the notches, the rope would have to stretch sufficiently to accommodate the additional length provide by the protrusions 3140. The protrusions having a trapezoidal shape also serve in some embodiments to wedge the rope between the notches 3120 and the protrusions 3140 at the on of the non-parallel sides of the protrusion.

The rope securing device further includes a hole 3130 that passes through the entire device in the width 3110 direction. These may be referred to as "bore holes" in alternative embodiments. Two additional holes 3135 pass through the device in the height 3145 direction.

Figure 31B:
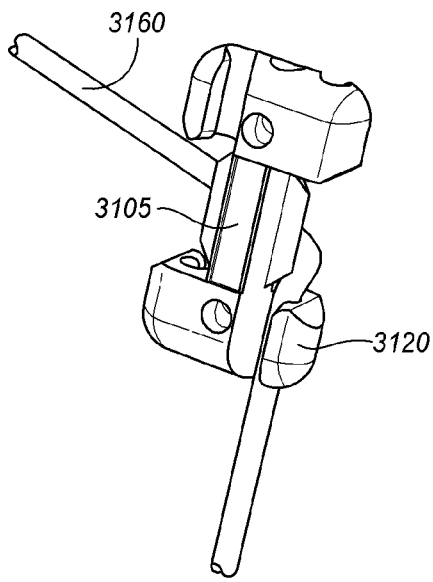
FIGS. 31B-31R show rope configurations for use with the rope device for FIG. 31A.
Figure 31C:
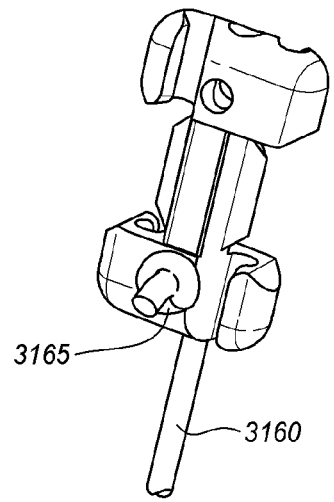
Figure 31D:
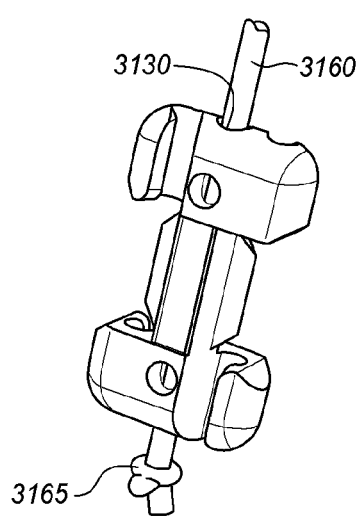
Figure 31E:
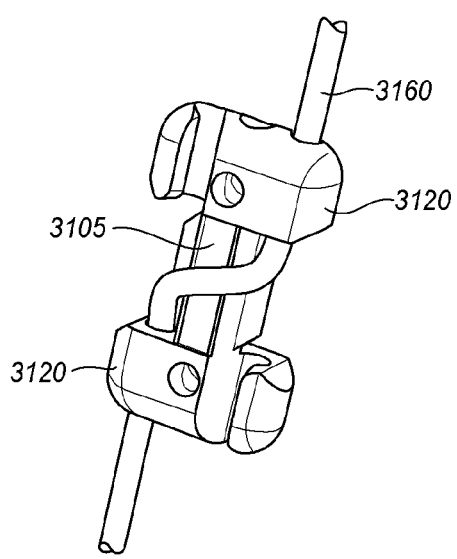
Figure 31F:
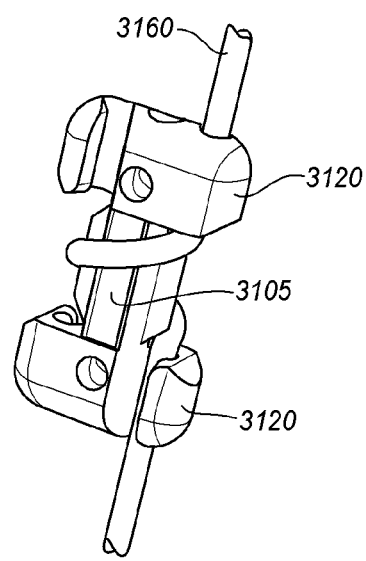
Figure 31G:
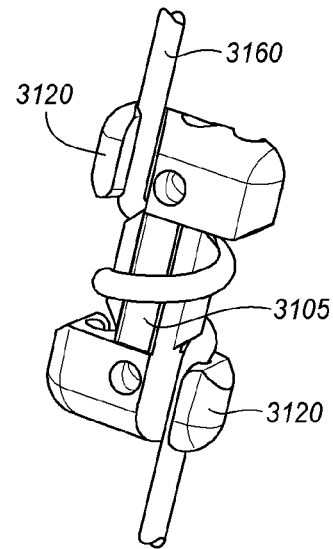
Figure 31H:
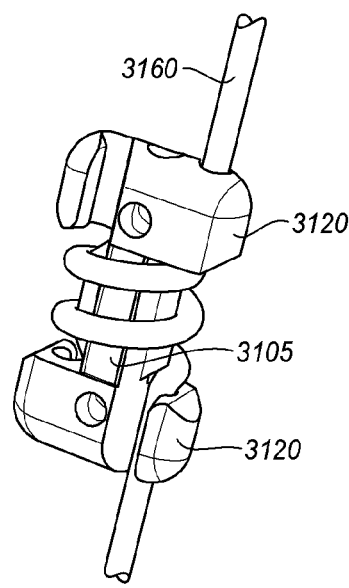
Figure 31I:
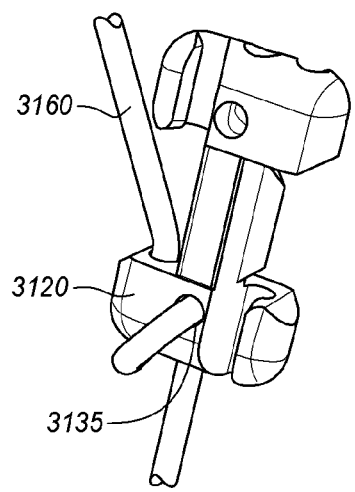
Figure 31J:
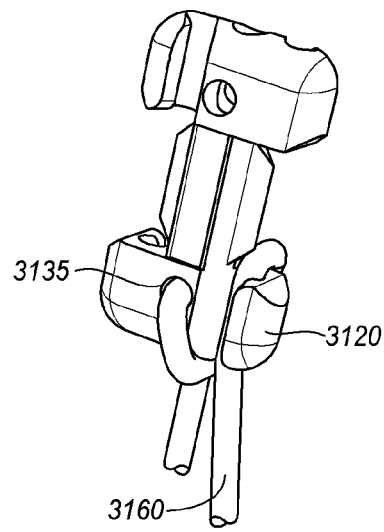
Figure 31K:
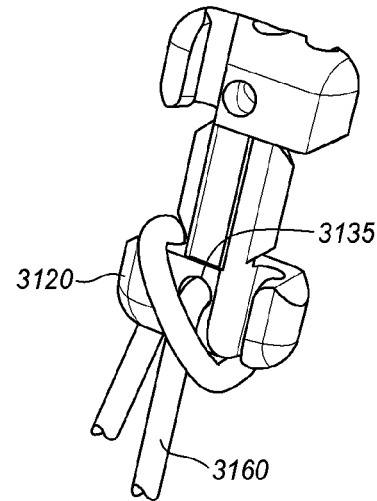
Figure 31L:
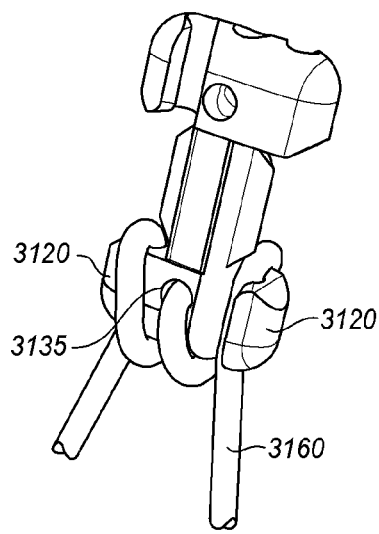
Figure 31M:
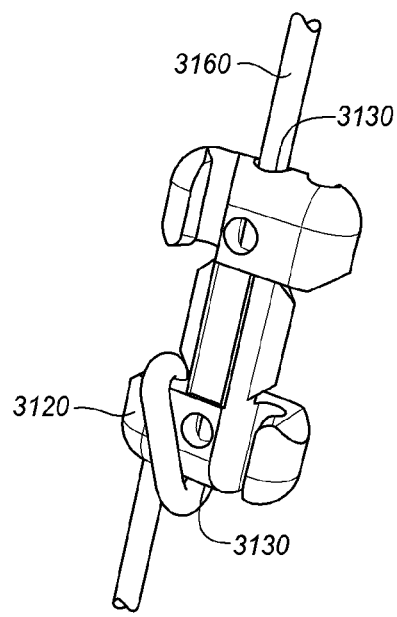
Figure 31N:
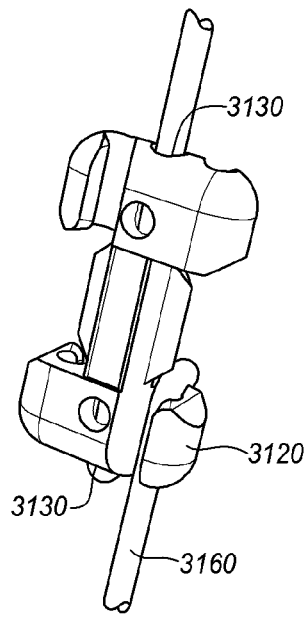
Figure 31O:
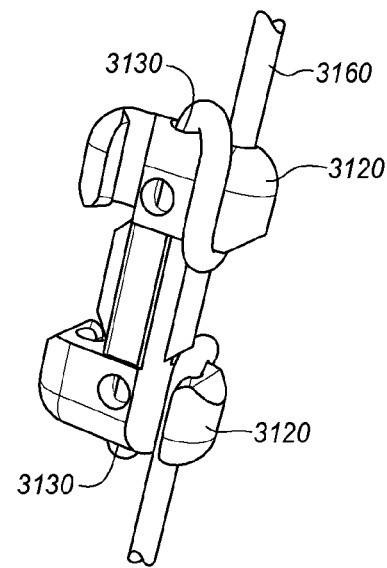
Figure 31P:
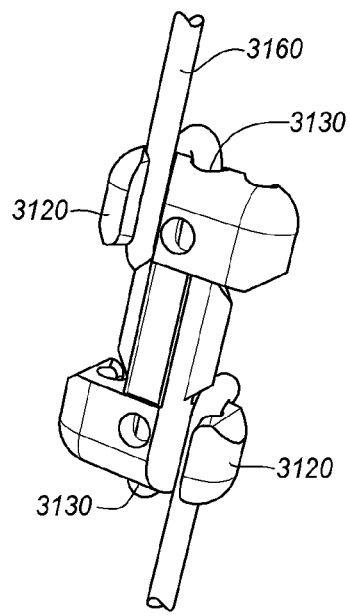

The unique arrangement of the holes, grip features, and notches allows for numerous holding configurations of the rope, shown in FIGS. 31B-31P. FIG. 31B shows a basic wrap that is a starting point for many rope configurations. The rope 3160 is wrapped from one side of the device body 3105 to the other and through a rope notch 3120. FIG. 31C shows how the rope device 3100 may be attached to the end of a rope 3160 by passing the rope through hole 3135 and tying a knot 3165 in the end.

FIG. 31D shows another basic configuration where the rope 3160 is passed through the width of the rope device 3100 through holes 3130. FIG. 31E shows a wrap using two notches 3120. The rope 3160 begins on one side of the rope device 3100 in a first notch 3120 and passes to the other side of the rope device 3100 and then wraps back to the first side and through a second notch 3120. The first and second notches are on opposite sides of the rope device in this case. In an alternative, shown in FIG. 31F, the rope passes through opposing facing notches 3120 on either side of the device 3100 and the rope is wrapped around the device body 3105 once. FIG. 31G shows 1.5 wraps of the rope around the device body 3105 with termination points in notches on either side of the rope device 3100. FIG. 31H shows a similar configuration to 31F with two full wraps of the rope.

FIG. 31I shows a configuration for locking the rope 3160 using the hole 3130 and notch 3120. This configuration allows for securing the rope using a hole instead of wrapping the rope around the device body 3105. The tension of the rope in this configuration can be readily adjusted by un-notching the rope 3160 and pulling the rope in one direction and then re-notching the rope. In one alternative, the rope passes in through hole 3135 and then out through hole 3130. Holes 3135 and 3130 intersect within the device 3100. FIG. 31J shows a similar configuration to that of FIG. 31I that includes an extra half wrap of the rope around the device which results in more friction on the rope 3160.

FIG. 31K shows yet another configuration for the rope wherein the rope wraps over itself, providing additional tension and friction. The rope 3160 passes through hole 3135, around the back of one notch 3120, and crosses rope 3160, finally passing through a second notch 3120. FIG. 31L shows another configuration passing the rope 3160 through a first notch 3120, wrapping it around through hole 3135, and wrapping it around and through a second notch 3120. FIG. 31M shows yet another configuration passing rope 3160 through a first notch 3120 and hole 3130 which passes through the width of the rope device 3100. FIG. 31N is a flip view of FIG. 31M.

FIG. 31O utilizes two notches 3120 and hole 3130, passing the rope 3160 through a first notch 3120 and wrapping it around and through hole 3130. After exiting hole 3130, the rope 3160 is passed around and through a second notch 3120. In FIG. 31O, the notches 3120 that are utilized are on the same side of the rope device 3100. FIG. 31P differs in that the notches 3120 are on opposite sides of the rope device 3100.

Figure 31Q:
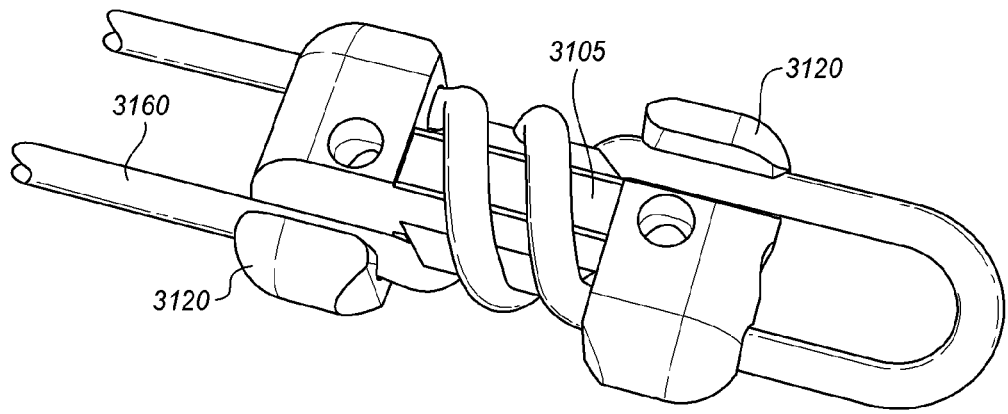

These above configurations shown in FIGS. 31B-31P show the elements of wrapping techniques that are used in creating more complicated attachment techniques. For instance, FIG. 31Q shows the formation of an anchor loop using the rope device 3100. First, the rope is wrapped and notched in a configuration as shown in FIG. 31F. This configuration is formed using notches 3120 on one side of rope device 3100. The rope 3160 then is looped around and the configuration of FIG. 31F is completed on the other side of rope device 3100, forming the loop shown. This is but one example of how any and all of the configurations show in FIGS. 31B-31P may be combined to create unique loops or attachments.

Figure 31R:
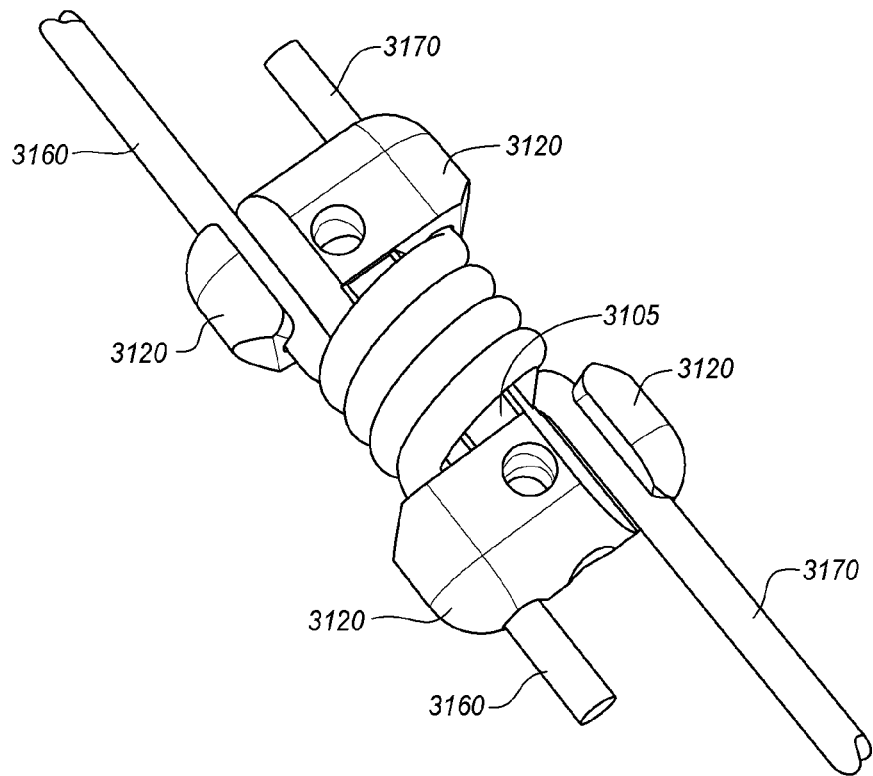

Another configuration allowing for the connection of two ropes (or opposite ends of the same rope) is shown in FIG. 31R. This connection utilizes the configuration of FIG. 31H twice, from opposite sides and ends of the device 3100. Rope 3160 and rope 3170 are neatly wrapped around each other in an alternating fashion on device body 3105. Numerous additional configurations are possible. Alternatives include the incorporation of one or more ropes and the incorporation of one or more of the techniques shown in FIGS. 31B-31R. The numerous options allow a user to attach a rope to objects or other ropes in a very wide variety of configurations. The intuitive nature of the notch and wrap system and additional procedures involving the holes in the device allows the user to easily improvise using the techniques of FIGS. 31B-31R to fit the purpose for which the user is tying the rope.

Figure 32:
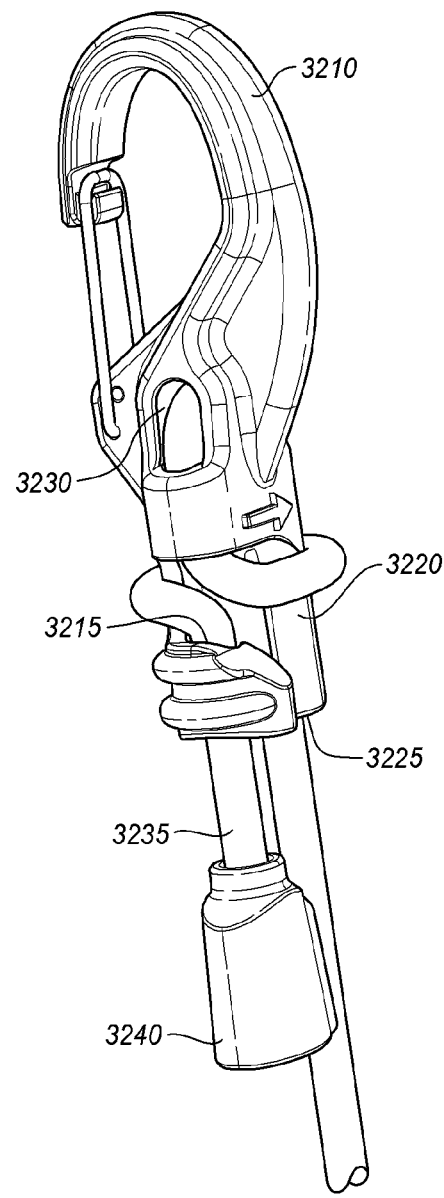
FIG. 32 shows an alternative embodiment of a rope device.
Figure 33:
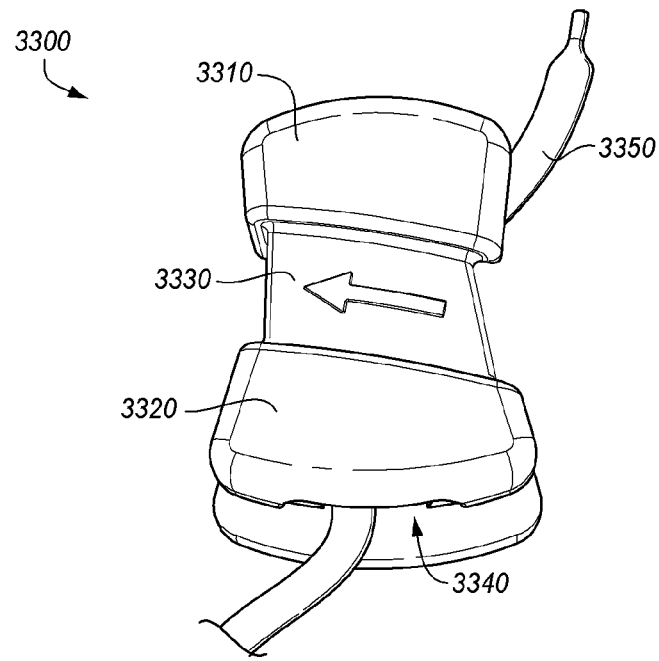
FIG. 33-37B show another embodiment of a rope device for use with shoelaces.

FIG. 32 shows an alternative embodiment of a rope device, configured for usage with a bungee cord and carabineer end. The device includes a carabineer end 3210 with an integrated rope device 3220. The rope device includes a tube 3225 for the bungee cord 3235. The bungee cord 3235 passes up through the tube 3225 and passes over rounded tension point 3230. The bungee cord 3235 then is wrapped around the body of the integrated rope device and is locked down in notch 3215. By removing the bungee cord 3235 from the notch 3215 and unwrapping the bungee cord 3235, the length of rope may be readily adjusted. Furthermore, round tension point 3230 may be used as a leverage point to tension the bungee cord 3235. After tension is applied, the cord may be easily wrapped and notched in notch 3215 without releasing tension. A clip 3240 is further included to clip the loose end of the bungee cord 3235 to the cord itself.

FIGS. 33-37 show another embodiment of a rope device. The rope device 3300 is designed to be used with shoelaces; however, alternative uses are possible. The rope device 3300 includes a first raised surface 3310 and a second raised surface 3320. Between the two raised surfaces is a wrapping area 3330. The rope device includes a first opening 3340 through which the shoelaces 3350 are passed.

Figure 34:
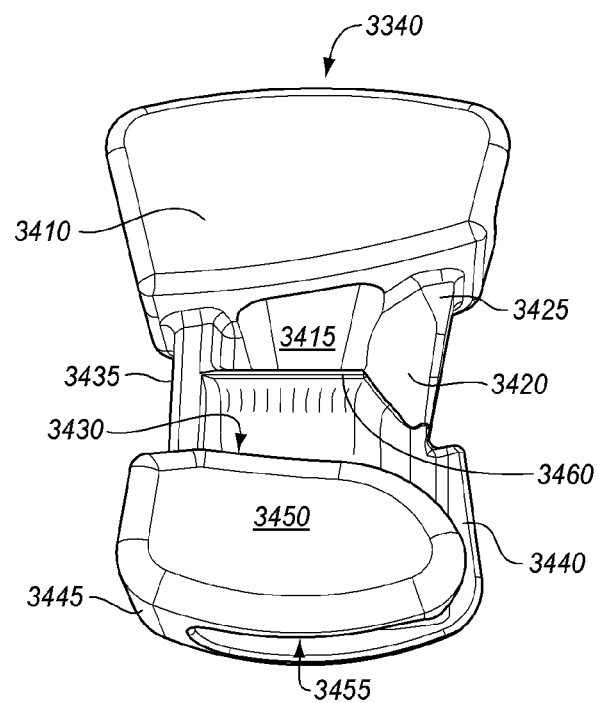

FIG. 34 shows the back view of the rope device 3300. Surface 3410 and raised surface 3320 form the front and back of first opening 3340. Laces 3350 pass through this opening and are clenched in depression 3415. The laces 3350 are directed around the device by rounded groove 3420 and the corresponding side wall 3425. The laces 3350 then are wrapped around wrapping area 3330 and crossed over side wall 3435 through opening 3430. The laces 3350 pass under surface 3450 which is attached only on one side at attachment point 3445. The laces 3350 exit at opening 3455. A gap exists between surface 3450 and raised side wall 3440. Therefore, instead of attempting to pass the laces 3350 through opening 3430, the laces 3350 may be pulled through the gap between surface 3450 and raised side wall 3440. This gap is narrowed, so significant tension needs to be applied to the device in order to pull the laces into place. This configuration is referred to as a "locking configuration" and will be explained in more detail below.

Alternatively, instead of wrapping the laces around the wrapping area 3330, the laces may simply be passed through opening 3430 and out opening 3455. In this case, protrusion 3460 provides some tension to the laces, since the laces must stretch over the protrusion before descending into depression 3415. This is referred to as the "cinching configuration".

Figure 35:
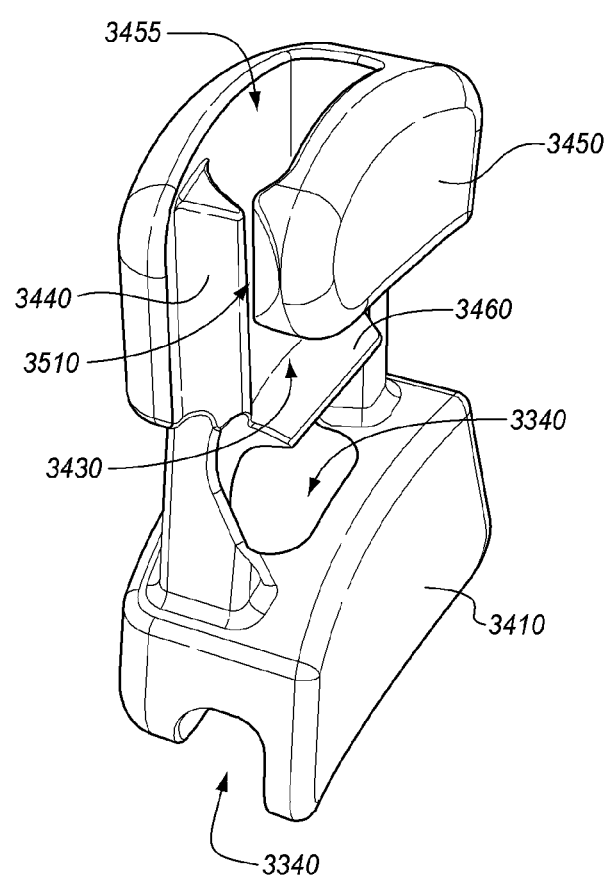

FIG. 35 shows a perspective view of the rope device 3300. The gap 3510 between surface 3450 and raised side wall 3440 may be seen clearly. The raised nature of protrusion 3460 is also clear.

Figure 36A:
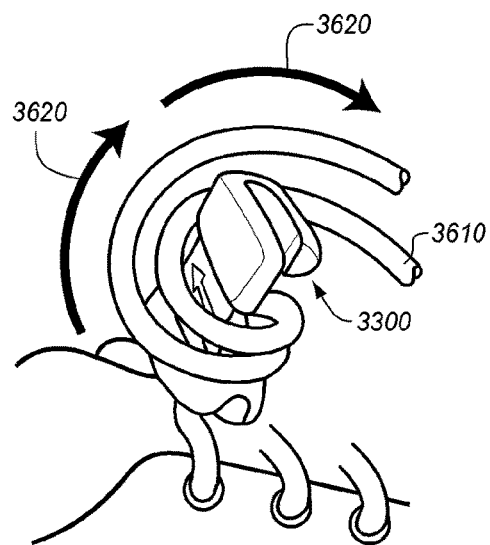
Figure 36B:
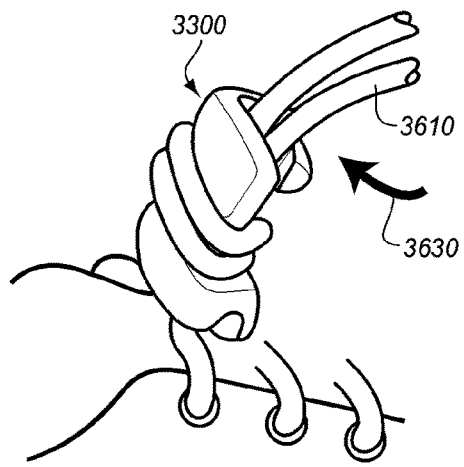
Figure 37A:
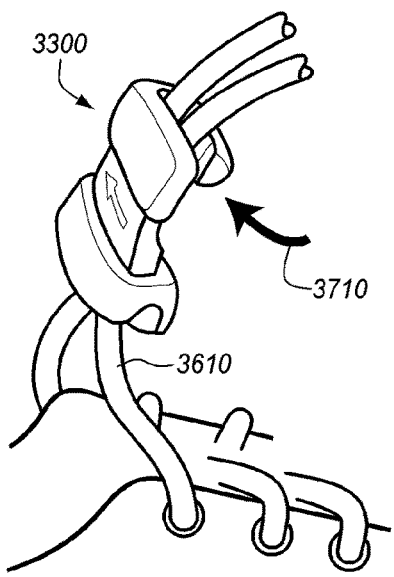
Figure 37B:
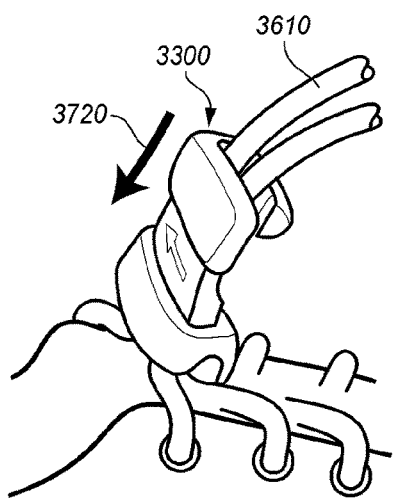

FIGS. 36A and 36B show the locking configuration for device 3300. After passing through opening 3340, the laces 3610 are wrapped around in direction 3620. The laces 3610 are then pulled in direction 3630 through gap 3510 to lock them in place. FIGS. 37A and 37B show the clinching configuration for device 3300. The laces 3610 are passed through opening 3340 and then pulled through gap 3510 in direction 3710. Rope device 3300 then may be slid in direction 3720 along laces 3610 to clench and tighten the laces 3610.

As compared to other rope joining and locking techniques, embodiments of the rope device encompass the broad spectrum of features achieved in this design.

Various embodiments of a rope device described herein have at least some the following characteristics:

Reliable single part design.
Simple and easy to use.
Compact size with minimal footprint both as a device and in application.
Superior performance in adverse weather conditions.
Multiple configurations and functionality.
Accommodates add-on accessories to further enhance functionality.
Reduced directional dependencies.
Adjustable rope retaining force under load conditions.
Scalable to different rope diameters.
Flexibility in manufacturing and multiple styles for broad market appeal.
Device geometries can be optimized for specific applications and/or load requirements.

Two additional aspects are worth noting. In one alternative, the rope device is manufactured from a material that is either reflective or one that glows in the dark; the device can be of great assistance in indicating the presence of an otherwise difficult to see line, which is of particular value when beckoned from one's tent in the middle of night to answer nature's call. In many alternatives to the rope device, numerous configurations of rope are possible. Configurations more complex and varied than those shown in FIGS. 5-8, 16-18, 24-26, 28, and 31B-31R are possible. By connecting multiple devices in serial and parallel arrangements, the possibilities increase quickly. A large variety of interesting and entertaining configurations may be created through the use of rope or ropes and one or more rope devices.

The device as described herein is a versatile easy-to-use rope device that replicates the behavior and performance of a variety of knots. The device can be used to conveniently and reliably secure ropes or secure other objects using ropes.

Among other benefits, the device alleviates the burden of tying (and untying) difficult or complex knots.

While the description above contains specificities, these should not be construed as limiting the scope of the embodiments but as merely providing illustrations of some of the presently preferred embodiments. The scope of the embodiments should be determined by the appended claims and their legal equivalents rather than by the examples given. The foregoing description of the embodiments of the rope device has been presented only for the purpose of illustration and description and is not intended to be exhaustive or to limit the rope device to the precise forms disclosed. Numerous modifications and adaptations are apparent to those skilled in the art without departing from the spirit and scope of the embodiments.

The invention claimed is:

1. A device for tensioning shoe laces, comprising:
   a rope device, the rope device including:
      a first raised surface and a second raised surface, the first raised surface located at a first end of the rope device and the second raised surface located at a second end of the rope device, the second end distal from the first end;
      a wrapping area located between the first raised surface and the second raised surface, the first raised surface and the second raised surface raised in relation to the wrapping area;
      a third surface located on a back side of the second raised surface;
      a first opening, the first opening approximately perpendicular to the second raised surface and the third raised surface, the first opening being wider toward a first end of the rope device and narrower toward a second end of the rope device;
      a fourth surface located on a back side of the first raised surface;
      a second opening at the second end of the rope device, the second opening approximately perpendicular to the first raised surface and the fourth surface, the second opening including a side gap, the side gap located along a side of the device; and
      a raised sidewall, the raised sidewall located in the side gap, the raised sidewall approximately perpendicular to the first raised surface, the fourth surface and the second opening, the raised sidewall forming a narrowed entrance to the side gap.

2. The device of claim 1, further comprising:
   a protrusion on a back side of the wrapping area, the protrusion located between the first opening and the second opening.

3. The device of claim 2, wherein the protrusion is angled towards the first opening, forming an acute angle with the back side of the wrapping area.

4. The device of claim 3, wherein a depression is formed in the back side of the wrapping area proximate to a vertex of the acute angle.

5. The device of claim 4, wherein the wrapping area includes side edges, and the side edges are narrowed in comparison to the side edges of the first raised surface and the second raised surface, such that a width of the wrapping is less than that of the first raised surface and the second raised surface.

6. A lace and device tensioning system, the system comprising:
   a rope device, the rope device including:
      a first raised surface and a second raised surface, the first raised surface located at a first end of the rope device and the second raised surface located at a second end of the rope device, the second end distal from the first end;
      a wrapping area located between the first raised surface and the second raised surface, the first raised surface and the second raised surface raised in relation to the wrapping area;
      a third surface located on a back side of the second raised surface;
      a first opening, the first opening approximately perpendicular to the second raised surface and the third raised surface, the first opening being wider toward a first end of the rope device and narrower toward a second end of the rope device;
      a fourth surface located on a back side of the first raised surface;
      a second opening at the second end of the rope device, the second opening approximately perpendicular to the first raised surface and the fourth surface, the second opening including a side gap, the side gap located along a side of the device;
      a raised sidewall, the raised sidewall located in the side gap, the raised sidewall approximately perpendicular to the first raised surface, the fourth surface and the second opening, the raised sidewall forming a narrowed entrance to the side gap; and
      laces, the laces located such that they are passed through the first opening from the first end of the rope device toward the second end of the rope device, the laces further located such that they are wrapped from a back side of the wrapping area, around the wrapping area, back to the back side of the wrapping area, and through the side gap, such that they are located in the second opening.

7. The lace and device tensioning system of claim 6, further comprising:
   a protrusion on the back side of the wrapping area, the protrusion located between the first opening and the second opening.

8. The lace and device tensioning system of claim 7, wherein the protrusion is angled toward the first opening, forming an acute angle with the back side of the wrapping area.

9. The lace and device tensioning system of claim 8, wherein a depression is formed in the back side of the wrapping area proximate to a vertex of the acute angle.

10. The lace and device tensioning system of claim 9, wherein the wrapping area includes side edges, and the side edges are narrowed in comparison to the side edges of the first raised surface and the second raised surface, such that a width of the wrapping is less than that of the first raised surface and the second raised surface.

11. A lace and device tensioning system, the system comprising:
    a rope device, the rope device including:
       a first raised surface and a second raised surface, the first raised surface located at a first end of the rope device and the second raised surface located at a second end of the rope device, the second end distal from the first end;
       a wrapping area located between the first raised surface and the second raised surface, the first raised surface and the second raised surface raised in relation to the wrapping area;
       a third surface located on a back side of the second raised surface;

a first opening, the first opening approximately perpendicular to the second raised surface and the third raised surface, the first opening being wider toward a first end of the rope device and narrower toward a second end of the rope device;

a fourth surface located on a back side of the first raised surface;

a second opening at the second end of the rope device, the second opening approximately perpendicular to the first raised surface and the fourth surface, the second opening including a side gap, the side gap located along a side of the device;

a raised sidewall, the raised sidewall located in the side gap, the raised sidewall approximately perpendicular to the first raised surface, the fourth surface and the second opening, the raised sidewall forming a narrowed entrance to the side gap;

a protrusion on the back side of the wrapping area, the protrusion located between the first opening and the second opening; and laces, the laces located such that they are passed through the first opening from the first end of the rope device toward the second end of the rope device, the laces further located such that they are passed over the protrusion and through the second opening.

12. The lace and device tensioning system of claim 11, wherein the protrusion is angled toward the first opening, forming an acute angle with the back side of the wrapping area.

13. The lace and device tensioning system of claim 12, wherein a depression is formed in the back side of the wrapping area proximate to a vertex of the acute angle.

14. The lace and device tensioning system of claim 13, wherein the wrapping area includes side edges, and the side edges are narrowed in comparison to the side edges of the first raised surface and the second raised surface, such that a width of the wrapping is less than that of the first raised surface and the second raised surface.

* * * * *